(12) United States Patent
Okamura et al.

(10) Patent No.: US 7,087,671 B2
(45) Date of Patent: Aug. 8, 2006

(54) RECYCLED PLASTIC MOLDED PARTS FOR PHOTOSENSITIVE MATERIALS

(75) Inventors: Daisuke Okamura, Kanagawa (JP); Kazuo Kamata, Kanagawa (JP); Toshio Sata, deceased, late of Kanagawa (JP); by Machiko Sata, legal representative, Kanagawa (JP); by Kazuyoshi Sata, legal representative, Kanagawa (JP); by Akio Sata, legal representative, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 13 days.

(21) Appl. No.: 10/694,700

(22) Filed: Oct. 27, 2003

(65) Prior Publication Data
US 2004/0092612 A1 May 13, 2004

Related U.S. Application Data

(62) Division of application No. 09/963,472, filed on Sep. 27, 2001, now Pat. No. 6,783,715.

(30) Foreign Application Priority Data
Sep. 29, 2000 (JP) .............................. 2000-299238

(51) Int. Cl.
*C08K 3/04* (2006.01)
*C08J 11/04* (2006.01)

(52) U.S. Cl. ........................ 524/496; 524/495; 521/40; 521/40.5; 521/47

(58) Field of Classification Search ................ 521/40, 521/40.5, 47; 525/54; 524/495, 496
See application file for complete search history.

(56) References Cited

U.S. PATENT DOCUMENTS

| 3,988,285 A | 10/1976 | De Vrieze |
| 4,699,744 A | 10/1987 | Nakadate et al. |
| 4,780,357 A | 10/1988 | Akao |
| 4,810,733 A | 3/1989 | Sakuma et al. |
| 5,424,013 A * | 6/1995 | Lieberman ................. 264/40.1 |
| 5,600,391 A | 2/1997 | VanDeMoere et al. |
| 5,851,743 A | 12/1998 | Akao |

FOREIGN PATENT DOCUMENTS

| EP | 0 719 626 | 7/1996 |
| EP | 1 107 065 | 6/2001 |
| JP | 11-015112 | 1/1999 |

OTHER PUBLICATIONS

Wypych, George. Handbook of Fillers, 2nd Edition. Toronto, Plastics Design Library, 2000, p. 62. TP1114. W96.*
Lewis, Sr., Richard J. Hawley's Condensed Chemical Dictionary, 14th Edition. New York, John Wiley & Sons, Inc, 2002.*

* cited by examiner

*Primary Examiner*—Vasu Jagannathan
*Assistant Examiner*—Vickey Ronesi
(74) *Attorney, Agent, or Firm*—Young & Thompson

(57) ABSTRACT

A front cover, a rear cover and a base portion are crushed into a crushed material, and further pelletized into a recycled plastic pellet. The recycled plastic pellet is used as a part of a molding material to produce mold plastic parts for a photosensitive material. When the molding material is melt in heat, a thermoplastic resin is deteriorated by heat or modified. Therefore, properties and qualities of recycled plastic mold parts are less than those of new ones. Further, when the thermoplastic resin is deteriorated by heat, the photosensitive material reacts with the thermoplastic resin to decomposed products having an bad influence on photographic characteristics. In order to prevent the deterioration by heat, oxidation inhibiting materials are added, and in order to absorb the decomposed products, carbon blacks are added.

7 Claims, 7 Drawing Sheets

SECOND PLASTIC RECYCLING LINE
(NON-PELLETIZING LINE)

FIG. 6

(TABLE 1)

| | SAMPLE PLASTIC PELLET | | | | |
|---|---|---|---|---|---|
| | 1 | 2 | 3 | 4 | 5 |
| ESTIMATION | − | X | △ | ○ | ◎ |

X : MUCH LESS THAN WITH THE SAMPLE PLASTIC PELLET 1
△ : LESS THAN WITH THE SAMPLE PLASTIC PELLET 1
○ : LITTLE LESS THAN WITH THE SAMPLE PLASTIC PELLET 1
◎ : AS SAME AS WITH THE SAMPLE PLASTIC PELLET 1

(TABLE 2)

| | SAMPLE MOLD PARTS GROUP | | | | |
|---|---|---|---|---|---|
| | 1 | 2 | 3 | 4 | 5 |
| ESTIMATION | − | X | ○ | ◎ | ◎ |

X : MUCH LESS THAN OF THE SAMPLE MOLD PARTS GROUP 1
△ : LESS THAN OF THE SAMPLE MOLD PARTS GROUP 1
○ : LITTLE LESS THAN OF THE SAMPLE MOLD PARTS GROUP 1
◎ : AS SAME AS OF THE SAMPLE MOLD PARTS GROUP 1

FIG. 7

(TABLE 3)

|  | SAMPLE MOLD PARTS GROUP | | |
|---|---|---|---|
|  | 2 | 4 | 5 |
| IZOD IMPACT STRENGTH (J/m) | 61 | 57 | 61 |

(TABLE 4)

|  |  | SAMPLE FILM UNIT | | | | |
|---|---|---|---|---|---|---|
|  |  | 1 | 2 | 3 | 4 | 5 |
| ESTIMATION OF PHOTOGRAPHIC CHARACTERISTICS | | - | X | O | O | O |
| ESTIMATION OF PHYSICAL PROPERTIES | | | | | | |
| | TENSILE STRENGTH | - | O | O | O | O |
| | IMPACT STRENGTH | - | △ | △ | △ | O |
| | HEAT RESISTANCE | - | O | O | O | O |

X : MUCH LESS THAN THE SAMPLE FILM UNIT 1, UNUSABLE
△ : LESS THAN THE SAMPLE FILM UNIT 1, BUT BARELY USABLE
O : ALMOST AS SAME AS THE SAMPLE FILM UNIT 1. USABLE, NOPROBLEM.

RECYCLED PLASTIC MOLDED PARTS FOR PHOTOSENSITIVE MATERIALS

This application is a Divisional of U.S. patent application Ser. No. 09/963,472 filed on Sep. 27, 2001 now U.S. Pat. No. 6,783,715. The entire contents of the above-identified application is hereby incorporated by reference.

BACKGROUND OF THE INVENTION

1. Field of the Invention

The present invention relates to a method of recycling molded plastic parts for photosensitive material and to recycled plastic molded parts for photosensitive material.

2. Description Related to the Prior Art

Conventionally, molded plastic parts are used for example as a camera body of a lens-fitted photo film unit. The camera body contains a film cartridge as a photosensitive material, and simple photo mechanisms therein.

Almost all of the molded plastic parts of the camera body are used in order to pack the film cartridge in a light-tight fashion. Accordingly, they have ever been formed of a composition of thermoplastic resins. Hereafter, the molded plastic parts used for photosensitive material are simply called molded plastic parts.

The molded plastic parts must have following qualities and properties:

1. perfect light-shielding properties,
2. high temperature resistance and high weather resistance, that is, a shape and a size of the molded plastic part is not changed under temperature variations in use for a long time,
3. sufficient physical strength,
4. inflammability,
5. ease of formation and rareness of molding defect,
6. decreasing the cost,
7. no bad influence on human body.

When the qualities and effects 1–5 are not enough, there will be a bad influence on photographic characteristics, for example, fogging on a photo film, abnormality of photosensitivity, abnormality of color, and uneven density.

There are some reasons for the bad influence on the photographic characteristics. If a shape of the molded plastic part changes and the molded plastic part is defectively molded, the photo film is excessively pressed, which causes pressure fog and scratch on the photo film. Further, when the molded plastic part takes charge, static electricity on the molded plastic part causes a static mark (a branch-shaped and hazily circular fog). Not only such physical defects also chemical substances cause the bad influence on the photographic characteristics. The molded plastic part is often resolved into gases and the gases react to the photo film.

In order to obtain the properties and effects 1–5, an adequate resin is selected and used as a base of the molded plastic parts, and additives, for example light-shielding materials and the like, are added to the resin. Polystyrene resin is normally used. Polystyrene resin is cheap and therefore produced so much. And a shape and a size of the resin-formed part made of the polystyrene resin hardly changes. Further, carbon black is as the light-shielding material in use.

However, the normal polystyrene resin has defects, such as easiness to be eroded by some of oils or organic solvents, low temperature resistance, low weather resistance, insufficient physical strength and easiness to take charge. In order to increase physical strength, a rubber-like material is added to the polystyrene resin. The polystyrene resin containing the rubber-like material is a graft copolymer of styrene monomer and the synthetic rubber having impact strength, such as butadiene rubber and the like.

In order to compensate for another defects, lubricant, antioxidant, ultraviolet absorber, nucleus making agent, aging resistor, antistatic agent, and a dispersing agent. The lubricant increases the flowability of the thermoplastic resin and makes it easily molded. The antioxidant prevents the thermal deterioration of the thermoplastic resin and other additives, and the ultraviolet absorber prevents the photo deterioration of the thermoplastic resin. The nucleus making agent increases the Izod impact strength and abrasion resistance. The aging resistor has an effect not to decrease the physical strength of the thermoplastic resin in accordance with deformation for a long time. Further, the dispersing agent disperses the light-shielding material in the resin to increase the light-shielding properties.

The molded plastic part is molded by using a new pure plastic pellet. As the new pure plastic pellet is heated and melted, the additives partly disperse and react to other substances. Accordingly, adequate amount of the additives are added into the new pure plastic pellet, considering amount of the lost additives. Thus, the new molded plastic part can keep the predetermined effects and properties.

In order to protect the environment and decrease amount of the industrial wastes, industrial products are recycled. The molded plastic parts are withdrawn, crushed, melted to form it into strand-shape with an extruding machine, and cut into a pellet of a predetermined size. The recycled plastic pellet is mixed in the new pure plastic pellet in a production line, and the resin-formed parts are produced.

However, an examination shows that photographic characteristics of the recycled plastic molded part are less than that of the new molded plastic parts. Especially, the photo film in the recycled plastic molded parts is more fogged. The deterioration of the photographic characteristics becomes more obvious in the photo film of high photosensitivity. Accordingly, it becomes more problematic recently, as the photo film of high photosensitivity is used.

In recycling processes, the composition of resin is heated and melted to generate a molding material. Heating the molding material makes the deterioration of heat and the reactions of antioxidants for inhibiting the deterioration of heat proceed. This would be the reason for lower quality of the recycled plastic molded parts than that of the new ones.

SUMMARY OF THE INVENTION

In view of forgoing, an object of the present invention is to provide a method for recycling molded plastic parts for photosensitive material and recycled plastic molded parts for photosensitive material in which the quality of the photosensitive material becomes lower.

In order to achieve the object and others, used molded plastic parts made of thermoplastic resin is crushed into a crushed material. The crushed material is used as a part of a molding material to produce a recycled plastic molded parts. At least carbon black and antioxidants are added to the molding material as additives, and then, the molding material is molded.

The used molded plastic part made of thermoplastic resin is crushed into the crushed material, from which a recycled plastic pellet is made. At least the recycled plastic pellet is used as a part of the molding material to produce the recycled plastic molded parts. At least carbon black and antioxidants are added to the molding material as the additives, and then, the molding material is molded.

The used molded plastic part made of thermoplastic resin is crushed into the crushed material, which is used as a part of the molding material to produce the recycled plastic molded parts. The additives are added to the molding material for capturing or absorbing decomposed products and inhibiting their production. The molding material is melted in heat and then molded, while it partly decomposes into the decomposed products which cause the deterioration of heat and the lost of the effects and properties of the recycled plastic molded parts.

The used molded plastic part made of thermoplastic resin is crushed into the crushed material, from which the recycled plastic pellet is made. The recycled plastic pellet is used as a part of molding material to produce the recycled plastic molded parts. The additives are added to the molding material for capturing or absorbing the decomposed products and inhibiting the production of the decomposed products. The molding material is heated and then molded with injecting to the recycled plastic molded part, while the molding material partly decomposes into the decomposed products that cause the deterioration by heat and the lost of the effects and properties of the recycled plastic molded parts.

Carbon black and antioxidants are preferably used as the additives for inhibiting the production of the decomposed products.

Preferably, average of radiuses of the carbon black particle is preferably 10–80 nm, and content of the carbon black with respect to the molding material with the additives is 0.2–1.2 wt. %.

Content of the antioxidants with respect to the molding material with the additives is 0.02–0.3 wt. %.

The recycled plastic molded part made of the thermoplastic resin is molded with injection by using the molding material in which the crushed material is added. The crushed material is made by crushing the used molded plastic parts. When the recycled plastic molded parts are molded, at least carbon black and antioxidants are added to the molding material as additives.

The recycled plastic molded parts made of the thermoplastic resin are injection molded by using the molding material in which the recycled plastic pellets are added. The recycled plastic pellets are formed of the crushed material made by crushing the used molded plastic parts. When the recycle articles are molded, at least carbon black and antioxidants are added to the molding material as additives.

The used molded plastic part made of thermoplastic resin is crushed into the crushed material, which is used as a part of the molding material to produce the recycled plastic molded parts. At least a new rubber-like material, carbon black and antioxidants are added to the crushed material as additives.

The used molded plastic parts made of thermoplastic resin is crushed into the crushed material, from which recycled plastic pellets are made. The recycled plastic pellets are used as a part of the molding material to produce the recycled plastic molded parts. At least new rubber-like material, carbon black and antioxidants are added to the crushed material as additives. The averaged radius of the carbon black particle is preferably 16–24 nm.

The recycled plastic molded part made of thermoplastic resin is molded with injection by using the molding material to which the crushed material is added. The crushed material is made by crushing the used molded plastic parts. When the recycled plastic molded parts are molded, at least new rubber-like materials, carbon black and antioxidants are added to the molding material as additives.

The recycled plastic molded part made of thermoplastic resin is molded with injection by using the molding material to which the recycled plastic pellets are added. The recycled plastic pellets are formed of the crushed material made by crushing the used molded plastic parts. When the recycled plastic molded parts are molded, at least new rubber-like materials, carbon black and antioxidants are added to the molding material as additives. The averaged radius of the carbon black particle is preferably 16–24 nm.

According to the invention, the used molded plastic part made of thermoplastic resin is crushed in the crushed material. The crushed material or the recycled plastic pellet which is made by pelletizing the crushed material is used as the part of the molding material for the molded plastic part, and at least the carbon black and the antioxidants are added as the additives in the molding material while the used molded plastic parts are processed for recycling. Accordingly, it is prevented that the photographic characteristic becomes lower.

Further, the impact strength hardly becomes lower, as the new resin containing rubber is added while the used molded plastic parts are processed for recycling.

The molded plastic parts to be recycled are crushed after the carbon black is added. Therefore, the recycled plastic molded parts becomes dark.

BRIEF DISCRIPTION OF THE DRAWINGS

The above objects and advantages of the present invention will become easily understood by one of ordinary skill in the art when the following detailed description would be read in connection with the accompanying drawings.

FIG. 6 is a table illustrating results of first and second examinations for photographic characteristics;

FIG. 7 is a table illustrating results of examinations for impact strength and overall characteristics.

PREFERRED EMBODIMENTS OF THE INVENTION

Figure 1:
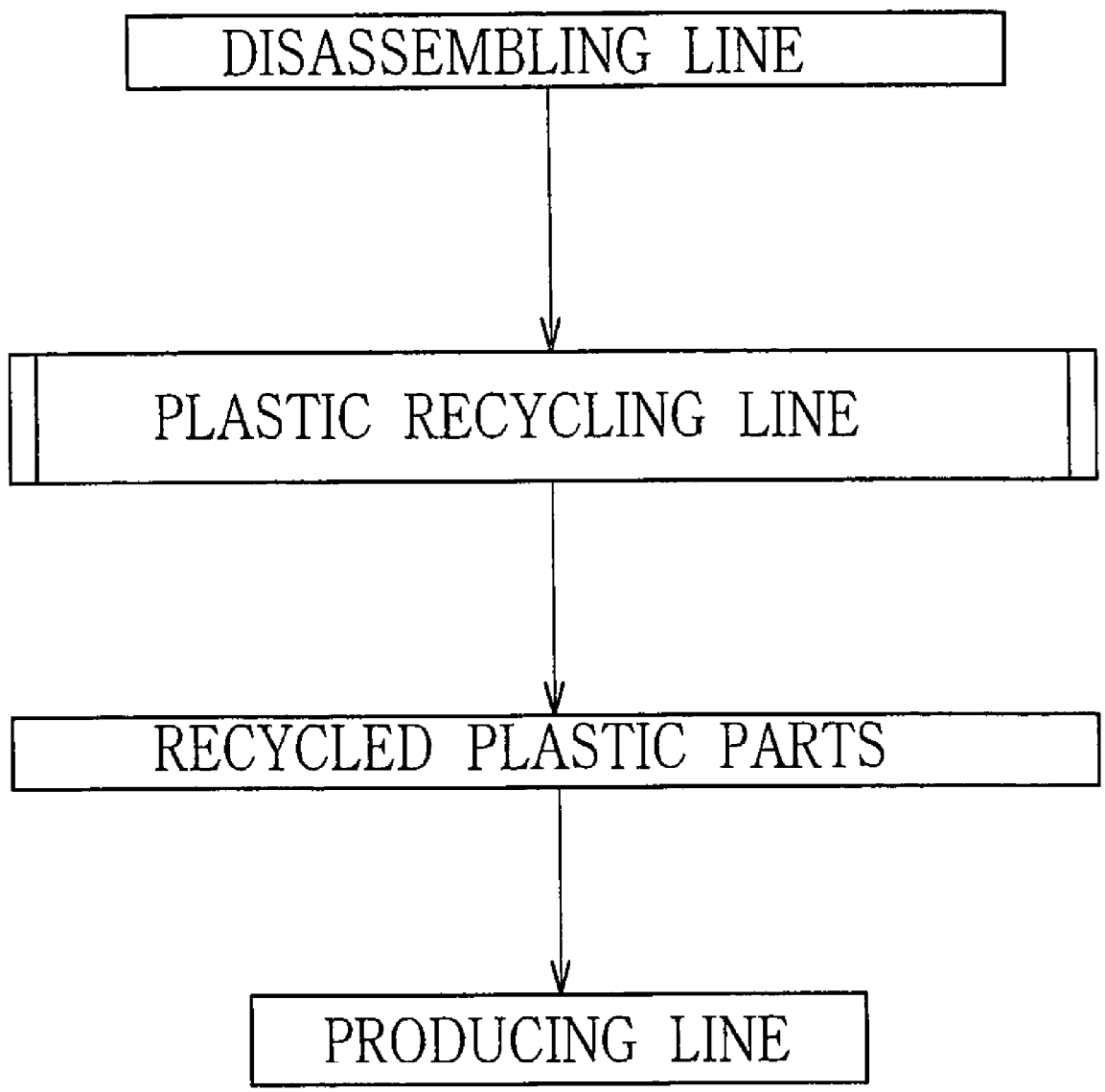
FIG. 1 is a flowchart illustrating a process of recycle.

Materials of resins used for an molded plastic part will be explained. The molded plastic part is preferably molded by using a thermoplastic resin, and a light-shielding material is preferably added in the thermoplastic resin in order to provide for a thermoplastic resin with a light-shielding ability.

If necessary, one or two sorts of following additives may be added into a plastic pellet. The additives are for example thermoplastic elastomer, lubricant, antistatic agent, dripproof agent, fire retardant additives, ultraviolet absorber, metal deterioration inhibitor, compatibilizer, inorganic or organic pigment, processing aid, antioxidant, aromatic, desiccant agent, hygroscopic agent, chelating agent, inorganic or organic nucleus making agent, plasticizer, and the like. Note that the sorts and amount thereof are adjusted so that the photographic characteristics of a photosensitive material may not become wrong.

The thermoplastic resins suitable for the molded plastic parts are polymerized by using a multi-site polymerization catalyst in the conventional art. Such thermoplastic resins are for example, homo-polyethylene resins, ethylene copolymer resins, homo-polypropylene resins, propylene-α-olefin copolymer resin, homo-polystyrene resin, polystyrene resin including rubber-like material, ABS resin, acrylonitrile-styrene resins, AAS (ASA) resin, AES resin (weather and impact strength resin), syndiotactic polystyrene resin. Further, the thermoplastic resins are also polymerized by using a single-site catalyst, such as polystyrene resins, polyolefin thermoplastic elastomer, homo-polypropylene resin, propylene-α-olefin copolymer (random type or block type), homo-polyethylene resins of several densities, ethylene-α-olefin copolymer resins of several densities, styrene resins, and the like.

The styrene resins include, for example, normal polystyrene resin, high impact polystyrene resin (called synthetic rubber graft polymerized polystyrene resin, or HIPS resin), styrene-acrylonitrile resin, styrene-acrylonitrile-butadiene resin, AES resin, styrene-methyl methacrylate-acrylonitrile resin, acrylonitrile-acryl rubber-styrene resin, styrene-butadiene block copolymer resin, and styrene-maleic anhydride copolymer resin.

The high impact polystyrene resin is not expensive and easy to form. Such polystyrene resins include 0.01–5 wt. % of the lubricant, 1.0–10 wt. % of synthetic rubber particle whose average diameter is 1.5–5 μm, 0.001–1.0 wt. % of antioxidants, 0.1–10 wt. % of the light-shielding materials.

The styrene resins used in the present invention, so far as properties thereof are not damaged, may be copolymerized with other monomers such as α-olefins, dienes, cycloolefins and acrylates. The α-olefins include propylene, butene-1, pentene, 4-methyl pentene-1, hexene, octane, decen and the like. The dienes include butadiene, isoprene and the like. The cyclolefins include cyclopentene, cyclohexene, cyclopentadiene, and the like. The acrylates include methylacrylate, ethylacrylate, butylacrylate, and the like.

According to the especially preferable thermoplastic resins, properties (physical strength, rigidity, heat resistance, abrasion resistance and the like) are excellent. But the thermoplastic resins are not restricted when they are stable in high temperature. There are for example, aromatic polyester resins, polyamide resins, olefin resins and styrene resins. The aromatic polyester resins are made of aromatic dicarboxylate and diol or oxycarboxylic acid, such as polyethylene terephthalate (PET), polyethylene naphthalate (PEN), polybutylene naphtalate (PBN) and the like. The polyamide resins include nylon 6—6, nylon 6–10, nylon 12, nylon 46. The olefin resins are made of ethylene, propylene, butene, and the like. The styrene resins include homo-polystyrene, styrene-butadiene copolymer, styrene-acrylonitril copolymer, ABS resin and the like. Further there are polycarboxylate resin, poly phenyleneoxide resin, polyalkyl acrylate resin, poly acetal resin, polysulfon resin, polyethersulfon resin, poly phenyl sulfide, polyetherimido resin, poly ether ketone resin, fluororesin, and the like. More than two kinds of the thermoplastic resins may be mixed. Especially, mixture of more than two kinds of the thermoplastic resins having high compatibility is called polymer alloy. The molded plastic part is preferably formed of the polymer alloy, as it has good appearance and the polymer alloy has large physical strength. Note that the thermoplastic resins are not restricted in the examples when they are stable in high temperature.

In the present invention, the thermoplastic resin may be mono-polymer resin, homo-copolymer resin, or mixture more than two kinds of these resins, but not restricted in them. They may be mixed in optional mixture method, such as physical blend method, chemical blend method, and polymer complex method.

The thermoplastic elastomer will be explained. The thermoplastic elastomer has high impact strength and increases the physical strength of the molded plastic part. The thermoplastic elastomer further increases dispersibility of the added light-shielding material. Therefore, without increase of amount of the added light-shielding material, the molded plastic part has enough light-shielding ability. The small amount of the light-shielding material does not reduce the physical strength.

The represetative thermoplastic elastomers (hereafter TRE) having the above-described effects are categorized, in accordance with their chemical structures, into the following types: styrene-type (hereafter SBC), ester-type (hereafter TPEE), olefin-type (hereafter TPO), vinyl chloride-type (hereafter TPVC), amide-type (hereafter TPAE), crystallized 1,2-polybutadiene-type (hereafter RB), ionomer-type, fluorine-type (hereafter F-TPE) urethane-type (hereafter TPU), and isoprene-type, and the like.

The representative TPEs are TPR (Uniroyal), TPN or Somel (E. I. Du pont de Nemours), Telcar. Estane (B. F. Goodrich Chemical), Vistaflex (Exxon Chemical), Visalon (Esso Chemical), Ren flex (Ren Plastics), Santoprene (Monsanto), Kletan-TP (Naamloze Vennootschap DSM), Uneprene (International Synthetic Rubber), Dutral TP (Montedison), Dutral TP (Montedison), Esprene EPR (or Sumitomo TPE) (Sumitomo Chemical Co.), Mirastomer (Mitsui Chemical Co.), JSR-sermolan (Nihon Gosei Rubber) and the like.

The thermoplastic elastomers of styrene-type will be described. They are produced with polymerization by using the single site catalyst. Their molecular weight distributions (averaged molecule weight Mw/molecule number Mn, the averaged molecule weight is calculated in GPC method) are 1.1–10, preferably 1.3–8, especially preferably 1.5–5. Such thermoplastic elastomers of styrene-type have high compatibility to conventional thermoplastic resins. Therefore, they are suitable for forming masterbatch plastic pellet to obtain the colored molded plastic part having high dispersibility and physical insistance. Thus, it is hardly broken and has a good appearance.

When an element of the masterbatch plastic pellet includes the thermoplastic elastomer of styrene-type, the molded plastic part formed of the resin composition has high compatibility. Therefore, even if the recycled resin may be mixed, the compatibility hardly becomes lower. Further, the resin used for the molded plastic parts may be diluted by one of crystalloid resins (olefin-type resin, polyacetal resin, polyamide resin, polyvinylidene resin, linear polyester resin and the like), non-crystalloid resin (styrene resin, polycarboxylate resin, polyvinylalcohol resin, methacrylic-type resin, vinyl acetate-type resin and the like) or mixture of them. The thermoplastic elastomer is random, block, and graft copolymer of styrene-type monomer (hard segment) and other monomers (soft segment), such as mono- or diolefin and the like, and may be also hydrogenated copolymers of them.

The styrene-type monomers are for example, styrene, a-chrolostyrene, 2,4-dichrolostyrene, p-methoxystyrene, p-methylstyrene, p-phenylstyrene, p-divinylbenzene, p-(chrolomethoxy)-styrene, α-methylstyrene, o-methyl-α-methylstyrene, m-methyl-α-methylstyrene, p-methyl-α-methylstyrene, p-methoxy-α-methylstyrene, and the like. Especially preferable is styrene. As diolefine, there are nonconjugated diene including dicyclopentadiene, 1,4-hexadiene, cyclooctadiene, methyl norbornene, and the like, and conjugated dienes including butadiene, isoprene and the like.

As mono-olefin-type, there are ethylene and α-olefin (including more than three carbon atoms) such as propylene, butene-1, hexene-1,3-methylbutene-1,4-methylpentene-1, heptene-1, octane-1, decene-1 and the like. Preferable are ethylene and propylene. As structures of block copolymer, there are ABA type in which hard segments are bonded to the soft segment at its both ends, multi block type in which the both blocks are repeated, radial block type in which the both block extend in all directions. In a region of working temperature, the polystyrene blocks form glass-like domains of several tens nm large and disperse in the segments. Thus, a physical cross point is formed when the soft segments are constrained.

The thermoplastic elastomers of styrene-type are obtained by copolymerising the above-described monomers in known methods, such as radical polymerize methods including anionliving polymerization, batch polymerization, continued chunk copolymerization, suspension polymerization, continued liquid polymerization, emulsing polymerization and the like. Especially preferable is the anion living method, in which organic lithium compounds are usually used as initiator in order to microscopically regulate structures of diene type polymer. There are two methods of polymerization. One of them is the successive polymerization that both elements are successively copolymerized. In another one, after successively polymerization, moluculars are bonded in a coupling reaction to copolymer. In this method, coupling agent with multiple functional groups is used in order to produce a radial block type.

Content of the styrene-type monomers is 1–12 wt. %, compared with that of other monomers such as mono-olefins or diolefins which can copolymerize with the styrene-type monomers. The content is preferably 1.5–10 wt. %, and especially preferably 2–8 wt. %. When 1–12 wt. % of the styrene type monomers are contained in the mono-olefin or diolefin, the molded plastic parts that is often used in temperatures less than 0, such as a film spool, a film cartridge, an instant film unit, a camera body, a film sheet pack holder, a magazine for photo film, and a lens-fitted photo film unit, are not broken even if they are fallen from 30 cm height. Further, the lens-fitted photo film units have a high abrasion resistance. Accordingly, the photosensitive materials are not damaged if they are in the lens-fitted photo film units constructed of the molded plastic parts for more than three months. Therefore, the sensitivity of the photo film is neither partly increased nor the photo film fogs has a bad influence on photographic characteristics.

The elastomers of styrene-type described above include for example styrene-butadiene-styrene block copolymer resin, styrene-butadiene copolymer resin, styrene-isoprene copolymer resin, styrene-isoprene-styrene block copolymer, and their hydrogenezations, styrene-ethylene-butylene-styrene block copolymer resin, styrene-ethylene-butylene block copolymer resin, and styrene-ethylene-propylene block copolymer resin, styrene-ethylene-propylene-styrene block copolymer, and the like. Especially preferable is styrene-butadiene copolymer among them.

Trade names and productions of the typical thermoplastic elastomers of styrene-type are for example Kraton (or Califlex TR), Kraton G (or Elexar) (Schell Chemical), Solprene T (Phillips Petroleum), Europrene SOL T (ANIC), Solprene T (Petrochi), Tafprene (Asahikasei) Solprene T, Asaprene T (Nippon Elastomer), Kuriarene (Denkikagaku), JSR, SBR (Nippon Gosei Rubber).

These thermoplastic elastomers of styrene-type may be used after modified by mixing with other thermoplastic elastomers in any conventional methods, such as liquid method or liquid mixing method. As modifier in the methods, unsaturated carboxylic acids or their derivatives are used.

The unsaturated carboxylic acid includes acrylic acid, methacrylic acid, maleic acid, endo-bicyclo[2,2,1]-5-heptene-2,3-dicarboxylic acid (endic acid), fumaric acid, tetrahydrophthalic acid, itaconic acid, citraconic acid, crotonic acid, isocrotonic acid, and their derivatives including acids, halides, imidos, anhydride, ester and the like. The derivatives are for example, malenyl chloride, maleimido, maleic anhydride, endic anhydride, methylacrylate, methylmethacrylate, citraconic anhydride, monomethylmaleinate, dimethylmaleinate and the like.

Not only one of the modifiers is selected but also more than two kinds of them can be used simultaneously. Content of the above-described modifiers, however it depends on the kind of the used thermoplastic elastomer of the styrene type, is about 0.1–15 wt. %, preferably 0.1–10 wt. %, compared with the thermal plastic elastomers.

The light-shielding materials are now explained. The light-shielding materials are added to provide the light-shielding ability for the thermoplastic resin. In order to prevent a bad influence on the photographic characteristics of the photosensitive materials, ISO sensitivities and the like, it is necessary that amount of the light-shielding materials are adjusted and sorts thereof are selected. Namely, the adequate additives and suitable forming conditions are selected.

1. Inorganic Compounds

A. Oxides

Silica gel, diatomaceous earth, alumina, titanium oxide, iron oxide, zinc oxide, magnesium oxide, antimony oxide, barium ferrite, strontium ferrite, bellilium oxide, pumice stone, pumice stone balloon, alumina fiber, and the like.

B. Hydroxides

Aluminum hydroxide, magnesium hydroxide, basic magnesium carbonate, and the like C. Carbonates Calcium carbonate, magnesium carbonate, dolomite, dosonite, and the like D. Sulfate Calcium sulfate, barium sulfate, antimony sulfate, calcium sulfite, and the like E. Silicate Talc, clay, mica, asbestos, glass fiber, glass balloon, glass beads, calcium silicate, montmorillonite, bentonite, and the like F. Carbon Carbon black, graphite, carbon fiber, carbon hollow sphere, and the like G. Others Iron powder, copper powder, lead powder, aluminum powder, molybdenum sulfide, boron fiber, silicon carbide fiber, brass fiber, potassium titanate, lead titanate zirconate, zinc borate, barium metaborate, calcium borate, sodium borate, aluminum paste and the like.

2. Organic Compounds woods powder (pine, oak), shell fiber (almond, peanut, cashew, hazelnut, macadamia nut, paddy shell), cotton, jute, paper fragment, cellophane fragment, nylon fiber, polypropylene fiber, starch (including modified starch, surface treated starch), aromatic polyamide fiber, and the like.

In these light-shielding materials, the inorganic compounds are preferably used, such as optically absorbable carbon black, titanium nitride, graphite, and iron oxide. Because they make the molded plastic part opaque. These are stable in higher temperature than 150 by forming the molded plastic part, and have high light-shielding ability, high heat resistance, and high resistance to light.

Especially preferable is the carbon black, as it has the following merits: its light-shielding ability is high, it dues to a small harmful influence on the photosensitive materials and has no bad influence on human body, it is cheap and stable in more than 200, it progresses the thermal stability of the thermoplastic resin, it can be burn, its color and surface are hardly changed even if it is used for long time, and its physical strength is hardly decreased.

The carbon black is classified in accordance with its material into furnace carbon black, acetylene carbon black, gas carbon black, channel carbon black, antra carbon black, ketchen carbon black, thermal carbon black, lamp carbon black, soot, animal carbon black, vegetable carbon black and the like. Preferable is the furnace carbon black among them in order to keep the light-shielding ability and low cost, and to make the properties of materials high. Also preferable is acetylene carbon black, ketchen carbon black, and electrically conductive furnace carbon black (balcan XC-72 and the like). The acetylene carbon black, even so being expensive, has antistatic effect. Further, several sorts of them may be also mixed if necessary.

The light-shielding materials to be added in the resin compounds for forming the molded plastic parts should cause no fog of the photosensitive materials, hardly increase and decrease the photosensitivity, and have high light-shielding ability. Accordingly, preferable is the carbon black whose particles have averaged diameter (measured with an electric microscope) of 10–120 nm, especially 10–80 nm and whose pH (measured with JIS K 6221) is 6.0–9.0. Particularly preferable is the furnace carbon black which includes less than 2.0% of volatile materials and whose DBP absorbency is more than 50 ml/100 g. Such furnace carbon black improves the photographic characteristic, the light-shielding ability, the dispersibility and the antistatic property, and hardly decreases the physical strength.

In order not to damage the photosensitive material, the molded plastic parts had better contain as small amount of sulfides and cyanides as possible. Content of sulfur in carbon black (measured in a method of ASTM D 1619-60) is less than 0.9%, preferably less than 0.6%, particularly less than 0.4%, especially less than 0.2%. The content of the free sulfur which directly causes to an bad influence on the photosensitive materials is less than 0.1%, preferably less than 0.05%, particularly 0.01%, especially 0.005%. (The content is measured in the following steps: Each samples are frozen in the liquid nitrogen and thereafter crushed. The crushed samples of 100 g are inserted in the soxhlet extractor, set for extraction in 8 hours under 60, cooled down, and made into solutions of 100 ml. The solution of 10 ml is inserted in the high velocity liquid chromatograph to determine the quantity of the free sulfur. The free sulfur is separated under the following condition; column is ODS silica column (4.5φ×15 mm); separating solution includes methanol and ice in ratio of about 0.95:0.05, which includes 0.01% acetylic acid and 0.01% triethylamine; current is 1 ml/min.: detection wave length is 254 mm. Then, the quantity of the free sulfer is measured in the absolute detection linear method.)

The content of cyanides (represented in ppm units of the amount of hydrogen cyanide determined in the 4-pyridine carboxylate pyrazolon absorption method) is less than 50 ppm, preferably less than 20 ppm, particularly less than 10 ppm, especially less than 5 ppm. The amount of absorbed iodine (measured with JIS K 6221) is more than 20 mg/g, preferably more than 30 mg/g, particularly more than 50 mg/g, especially more than 80 mg/g, and the absorption amount of dibutylphthalate (DBP) (measured with JIS K 6221) is more than 50 ml/100 g, preferably more than 60 ml/100 g, particularly more than 70 ml/100 g, especially more than 100 ml/100 g.

The typical trade name of the preferable carbon black is for example acetylene carbon black (Denki Chemical Co.), and carbon black #20(B), #30(B), #33(B), #40, #41(B), #44(B), #45(B), #50, #55, #100, #600, #950, #1000, #2200, #2200(B), #2400(B), MA8, MA11, MA100 (Mitsubishi Chemical Co.), and the like.

The light-shielding materials and the thermoplastic resins are mixed to in following forms:

(1) Equally colored pellet
    called colored compound, which is generally used;

(2) Dispersed powder
    also called dry color, the light-shielding material is treated with surfactant, and milled into powders after addition of the dispersion accelerator;

(3) Paste
    dispersed to plasticizer and the like;

(4) Liquid
    also called liquid color, the light-shielding material is dispersed in a surface active agent;

(5) Master batch pellet
    the light-shielding material is dispersed in high density in the plastic which will be colored;

(6) Wet grain
    the light-shielding material is dispersed in high density in the plastic, and the plastic is crushed in grains;

(7) Dry powder
    dry powder which is normal powder and not processed.

In the above-described forms, the master batch plastic pellet is preferable, as it neither pollute workshops nor cost so much. Japanese Patent Laid-open Publication Number S63-186740 discloses compounds of resins used for color master batch in which the light-shielding materials are dispersed to mix with a certain ethylene-ethylacrylate copolymer resin.

Secondly preferable are inorganic pigments whose reflactive index measured with oil-immersion method of Larsen is more than 1.50, metal powder, metal flake, metal paste, metal fiber, and carbon fiber.

The typical inorganic pigments of the reflactive index above 1.50 and metal powder are enumerated, the number in parenthesis is the reflactive index. However the present invention is not restricted in them.

The represetative inorganic pigments are for example rutil type titanium oxide (2.75), silicon carbide (2.67), anatase type titanium oxide (2.52), zinc oxide (2.37), antimony oxide (2.35), white lead (2.09), zinc white (2.37), lithopone (1.84), zircon (1.80), corundum (1.77), spinel (1.73), apatite (1.64), barites (1.64), barium sulfate (1.64), magnesite (1.62), dolomite (1.59), calcium carbonate (1.58), talc (1.58), calcium sulfate (1.56), silicic acid anhydride (1.55) quartz powder (1.54), magnesium hydroxide (1.54), hydrochloric acid magnesium carbonate (1.52), alumina (1.50) and the like.

The inorganic pigments of reflective index under 1.50, for example calcium silicate (1.46), diatomaceous earth (1.45), moisture silicic acid can not be used as the light-shielding material but as a blocking inhibitor, while their light-shielding ability is small.

In the recent boom of travel in abroad, a high photosensitive photo film whose ISO sensitivity is more than 400 passes through an X-ray inspection apparatus, which often causes the fog on the photo film. In order to inhibit fogging, the specific gravity of the light-shielding material is more than 3.1, preferably more than 3.4, especially more than 4.0. The typical light-shielding materials are enumerated as follows. However, the light-shielding materials of the present invention are not restricted in them. They may be pigments, powders, flake, whisker, fiber, and the like.

The light-shielding material whose specific gravity is more than 3.1 is for example, silicon carbide, barium sulfate, molybdenum disulfide, lead oxide (white lead), iron oxide, titanium oxide, magnesium oxide, barium titanate, copper powder, iron powder, brass powder, nickel powder, silver powder, lead powder, steel powder, zinc powder, tungsten whisker, silicon nitride whisker, copper whisker, iron whisker, nickel whisker, chromium whisker, stainless powder, stainless whisker, magnesite, apatite, spinel, corundum, zircon, antimony trioxide, barium carbonate, white zinc, chromium oxide, tin powder, and their mixtures.

Among the light-shielding materials, X-ray is effectively shielded with zircon, corundum, barium sulfate, barium chloride, barium titanate, lead powder, lead oxide, zinc powder, white zinc, tin powder, stainless powder, stainless whisker, iron oxide, tungsten whisker, and nickel whisker.

Considering the hyper photosensitive photo film used in the molded plastic part, the reflective index and the specific gravity of the light-shielding material are preferably more than 1.50 and more than 3.1, especially more than 1.56 and more than 3.4, respectively. The content of them, which depends on layer thickness and kinds of used resins, are preferably 0.05–40 wt. %.

As the light-shielding materials, oil absorptive inorganic pigments may be also used. The typical oil absorptive inorganic pigments may be white zinc (52), asbestin (50), clay (51), titanium oxide (56), kaoline (60), talc (60), carbon black (more than 60), activated carbon, and the like. The number in the parenthesis is amount of absorbed oil represented in unit of ml/100 g (measured with JIS K 6221). They effectively absorb the lubricant, antioxidants, organic nucleus-making agent, the surface active agent, which easily breed out, deodorant, aromatic, free-oxygen absorber, and the like.

The typical metal powder and metal paste are aluminum powder, aluminum paste, copper powder, stainless powder, iron powder, nickel powder, brass powder, silver powder, tip powder, zinc powder, steel powder, and the like. Adequate are the aluminum powder, the aluminum paste, the stainless powder, and the silver powder. Because others causes to damage the photo film. Accordingly, the light-shielding materials are carefully selected when they are used for the molded plastic parts for contacting the photosensitive material.

The aluminum powder in the present invention includes not only the powdered aluminum but also its mixture with aluminum paste. Preferably, particles of the powdered aluminum are covered with a covering material, and the volatile materials are removed from aluminum paste. They are added to the thermoplastic resins. So as to obtain the aluminum powder causing equal dispersibility, high formalization, high photographic characteristic, good appearance, and less terrible smell, the averaged diameter of aluminum powder particles is 0.3–50 μm, preferably 0.5–45 μm, especially 0.8–40 μm, and the averaged thickness is 0.03–0.5 μm, preferably 0.05–0.4 μm, especially 0.08–0.35 μm. Further, the carboxylic acids are contained less than 5 wt. %, preferably less than 4 wt. %, especially less than 3 wt. %.

Note that the aluminum paste is pasted by mixing the higher fatty acid, such as stearic acid, palmitic acid, oleic acid, with the aluminum powder being produced in the methods conventionally known. The conventional methods are such as ball mill, stamp mill, atomization, and the like.

Aluminum paste compound resin and aluminum paste master batch resin suits for the thermoplastic resin compound used in the present invention, as including volatile material only less than 3%, preferable less than 1%, especially less than 0.5%. In order to produce them, the dispersing agent such as metal soap is heated and mixed with the aluminum paste and the following compounds: for example, styrene resin of aromatic mono-vinyl resin (polystyrene resin, polystyrene resin including rubber, ABS resin, and the like), polyolefin thermoplastic resin (polypropylene resins, propylene-α-olefin copolymer resin, polystyrene resins, acid modified resin, ethylene-α-olefin copolymer resin, EVE resin, EEA resin, EAA resin), polyolefin resin of low molecular weight, thermoplastic elastomers (hereafter TPE, such as polystyrene type TPE composed of the soft segment of polybutadiene or polyisoprene and the hard segment of polystyrene, polyolefin type TPE, 1,2 polybutadiene type TPE, polyurethan type TPE, polyester type TPE, polyamide type TPE, polyethylenechloride type TPE, polyfluorocarbon type TPE, and the like, especially preferable is polystyrene type TPE, polyolefin type TPE, and the polyester type TPE), paraffin wax, tackfier (terpen resin, coumaroneindene resin, petroleum resin, mineral resin, and the like), antifungal agent (copper-8-quinolinolate, bisoxide (tributyltip oxide), trybutyltipacetate, bistrisulfite (tributyltiptrisulfite)tributyltiplaurylate), aluminum paste compound resin, and aluminum master batch. Then, low volatile materials are removed with a vacuum pump and the volatile materials are remained in the aluminum paste compound resin and aluminum master batch resin.

The aluminum paste master batch resin is particularly suited to the present invention so as to reduce bad smells and a bad influence on the photosensitive materials. Supposed that the molded plastic parts including mineral spirit less than 0.05% are produced from master batch resin containing 40 wt. % of the aluminum paste and 1,0 wt. % of the mineral sprit. Natural resin is added to the master batch resin in weight ratio of 19 to 1 so that the contents of the aluminum paste and mineral spirits may become 2 wt. % and 0.05 wt. % respectively. Further, as they are heated to form the molded plastic parts, the mineral spirit is evaporated in heat. Accordingly, less than 0.05% of the mineral spirits is contained in the molded plastic part. The amount of the mineral spirit does not damage the photographic characteristic of the photosensitive material.

The powdered aluminum is not produced only from the melted aluminum with atomization, granulation, dropping method by rotaty disk, evaporation, and the like, but also from aluminum foil by milling into flakes in ball mill, stamp mill, and the like. As the powder of a simple substance of aluminum is not stable in air, their surfaces are deactivated in conventional art.

The aluminum may be rolled with using rolling oil into aluminum foil of predetermined thickness (5–20 µm, preferably 6–15 µm, especially 7–10 µm). The aluminum foil is cut into flakes with a shredder. With annealing the flakes, fatty acids are removed, and thereafter, compounds of fatty acids having more than 8 carbon atoms are added to the flakes so that the content of the compounds may be less than 5 wt. %. Then, the flakes are powdered with ball mill, stamp mill, oscillating mill, or attritor mill. Thus, every particle of the powdered aluminum has its averaged diameter between 0.3–50 µm, and averaged thickness 0.03–0.5 µm, containing less than 5 wt. % of fatty acids. Such powdered aluminum is particularly adequate to the present invention, as it causes high dispersibility, high photographic characteristic, and excellent luster, and reduces the bad smell.

In view of form and quality, light-shielding ability, physical strength of the molded plastic parts, cost, and photosensitive property of the photosensitive material, the molded plastic parts contains the light-shielding materials between 0.05–40 wt. %. The content is adjusted as it changes in accordance with kinds of the light-shielding materials contained in the molded plastic part. It improves the effective light-shielding ability to use the carbon black, titanium oxide, aluminum powder. They are preferably contained between 0.05–20 wt. %, preferably 0.1–15 wt. %, particularly 0.15–10 wt. %, especially 0.2–5 wt. %.

When the content is under 0.05 wt %, it causes the fog on the photo film. Therefore, thickness of the molded plastic part must become larger. However, such molded plastic parts are not practical. Because the cost is increased, cooling down must be made for a long time after molding, warping is not easily, and sink mark often appears.

Oppositely, when the content is over 40 wt. %, the molded plastic parts are also not practical. The dispersibility becomes worse, and micro grids occur more frequently, which causes the pressure fog and scratches on the photo film. Further, as the carbon black absorbs more water, amount of water in the molded plastic parts becomes larger, which causes to damage the photosensitive materials and makes the photographic characteristic worse. Further, in this case, the molded plastic parts are not easily formed (the formability is not enough because of forming failures, such as foaming, silver streak, burning, pin hole, short shot and the like), and the physical strength decreases.

The resin compounds containing the light-shielding materials are preferably dried before used so that the content of the volatile materials (almost water) is less than 0.50 wt. %. Such resin compound due to a smaller bad influence on the photosensitive materials and prevents failure of forming the molded plastic parts, such as foaming and silver streak. Accordingly, the content of the resin compounds is preferably less than 0.40%, particularly less than 0.30%, especially less than 0.20%. Note that the resin compounds are dried by heating or in vacuum space.

Preferably, a surface treatment material is used for covering a surface of the particles of the light-shielding materials. The surface treatment material increases the flowability of the light-shielding material and the dispersibility thereof into resins more easily, and prevents a micro grid, which often cases abrasion mark, pressure fogging and scratches. The surface treatment materials are contained, in accordance with 100 parts by weight of the light-shielding material, 0.1–200 parts by weight, preferably 0.5–150 parts by weight, particularly 1–100 parts by weight, especially 2–80 parts by weight.

The typical surface treatment materials are enumerated as follows:
(1) coupling agent:
  1) coupling agent including azido silanate (disclosed in Japanease Patent Laid-Open publication S62-32125);
  2) silane type coupling agent (amino silane and the like);
  3) titanate type coupling agent;
(2) silica gel and alumina (coating after precipitation of silica gel, then alumina):
(3) higher fatty acid metal salt, such as zinc stearate, magnesium stearate, calcium stearate, and the like:
(4) surface active agent, such as sodium stearate, potassium stearate, oxyethylenedodecylamine and the like:
(5) mixture of barium sulfite, sulfuric acid, silicate acid (Water solutions of barium sulfite and sulfuric acid are mixed under excess barium ions to produce particles of barium sulfate whose averaged diameter is 0.1–2.5 µm, then mineral acid is added to the slurry. Barium silicate is decomposed into silica gel containing water, which is precipitated on the surface of the barium sulfate.):
(6) hydrated metal oxide (titanium, aluminum, cerium, zinc, iron, cobalt, silicon, and their mixture of more than two kinds), or metal oxide (titanium, aluminum, cerium, zinc, iron, cobalt, silicon, and their mixture of more than two kinds):
(7) polymer having at least one functional group of azilidine group, oxazoline group, and N-hydroxialkylamide group:
(8) polyoxylalkyleneamine compounds:
(9) selium cation, selected anion, and alumina:
(10) alcoxitan derivatives having α-hydroxicarboxyl group as substituent:
(11) polytetrafluoroethylene:
(12) polydimethylcyclohexane, or metamorphic silicon:
(13) phosphate ester:
(14) alcohol having 2–4 carbons:
(15) polyolefin wax (polyethylene wax, polypropylene wax):
(16) moisture aluminum oxide:
(17) silica gel or zinc compound (zinc chloride, zinc hydroxide, zinc oxide, zinc sulfate, zinc nitrate, zinc acetate, zinc citrate, their mixture, and the like):
(18) saturated polyhydroxyhydrocarbon:
(19) surface active agent (cationic, nonionic, amphoionic):
(20) metallic chelate compound (b-dititonchelate compound has excellent photographic characteristic and dispersive property) and the like.

Especially preferable are (1), (3), (12), (15), (16), (18), (19), (20). Because they due to the smaller bad influence on the photosensitive material to decrease the photographic characteristic (for example, prevents fogging, abnormal photographic characteristic, abnormal coloring, reduces the acne, and increases the dispersibility of the light-shielding material and flowability of resin.

Other materials are preferably used with the light-shielding materials for covering the surface, for example antistatic agents, lubricant, drop-proof agent and the like. Especially, if esters produced of the monocarboxylic acid having 20–40 carbons and alphatic monohydric alcohol having 20–40 carbons are added, the bad influence on the photographic characteristic is prevented, and the dispersibility and the flowability are improved. Further, biases of the motors are decreased and the appearance of the molded plastic parts becomes better.

As the monocarboxylic acid, there are monotanic acid melissic acid, cerotic acid, lacceric acid, and the like. as the monoalcohol, there are monotyl alcohol, melissyl alcohol, laccyl alcohol, ceryl alcohol, and the like.

These increase the flowability of the thermoplastic resin and is well known as the surfactant of the light-shielding material. Further, they are knows as inorganic and organic nucleus-making agent, effectively prevent flying and breeding out and increase the dispersibility and flowability of resin, if used as dispersing agent.

Such surface treatment materials are contained, in accordance with 100 parts by weight of the light-shielding material, 0.1–50 parts by weight, preferably 0.5–40 parts by weight, particularly 1–30 parts by weight, especially 1.5–20 parts by weight. If their content is less than 0.1 parts by weight, the surface is hardly coated. If the content is above 50 parts by weight, breeding out passes more frequently, and resin slips on a screw of injection molding apparatus that the discharge amount increases. Accordingly, the thickness of the molded plastic part becomes uneaqually and short shot tends to be generated, which makes hard to perform the successive injection mold.

The thermoplastic resin compounds may be also colored by adding the coloring light-shielding material so as to be semitransparent or non-transparent. Thus, the light-shielding ability and rigidity becomes higher, and the molded plastic part have better appearance, and failure of coloring and acne becomes less prominent. Especially, cases for photo film patrone is preferably colored as it can be used to easily acknowledge kinds of the photosensitive material in a non-transparent, semitransparent, or transparent case. (For example, the red case contains reversal film, the green case contains ISO sensitive 400 negative color film, the black case contains sensitive 800 negative color film, and the white case contains microfilm). As the coloring light-shielding material, there are dye, color pigment, white pigment, metal powder, metal fiber, metal flake, carbon black, and the like.

The representative coloring light-shielding materials are enumerated as follows.

Black; carbon black, iron black ($Fe_3O_4$), graphite, mineral black, aniline black, and the like:

White; titanium oxide, calcium carbonate, mica, white zinc, clay, barium sulfate, calcium sulfate, antimony white, lead white, lithopone, magnesium silicate:

Yellow; Titan Yellow, Yellow Iron Oxide, Chrome Yellow, Chrome Titanium Yellow, Disazo Pigment, Vat Pigment, Quinophthalene Pigment, isoindolinone, zinc yellow, cadmium yellow, loess, Pigment Yellow L, Hansa Yellow 3G, and the like:

Red; red iron oxide, disazo pigment, Monoazo Lake Pigment, Condensed Azo Pigment, Cadmium Red, Lake Red C, red lead, Permanent Red 4R, and the like:

Bleu; Cobalt Blue, Ultramarine Blue, Iron Blue, Phthalocyanine Blue, Cyanine Bleu, Indathrene Bleu, Indigo, Cyanine Bleu, and the like:

Green; Chromiumoxide Green, Titanium Green, Zinc Green, Emerald Green, Cobalt Green, Pigment Green, Phthalocyanine Green, Cyanine Green, and the like:

Silver; aluminum powder, aluminum paste, tin powder and the like:

Gold; Copper Powder, Copper Alloy Steel Powder, mixture of Aluminum Powder and Yellow-coloring pigments, Mixture of aluminum paste and Yellow-coloring pigments, and the like.

The carbon black and iron black are preferably used. Because they are cheap, have excellent light-shielding ability, antioxidant effect. Further, the photosensitive material can keep excellent photographic characteristic, spot trouble rarely occurs on the resin and the acne is not prominent.

In view of appearance and color of printing, when an image is printed on a package or a cartridge body, they are preferably printed in white, gray, yellow, gold or silver. The camera is often used in daylight or left under in sunshine for a long time, or sometimes used in a desert. Therefore, a camera made of the molded plastic parts, a film cartridge made of resin for APS, spool for the photo film, a film sheet pack, a film sheet pack holder, a lens-fitted photo film unit and the like are colored with one or two of light-shielding materials for coloring white, silver, yellow and gold, which can reflect the light.

Other additives can be added in the thermoplastic resins to characterize them, for example, lubricant, antioxidant, radical terminator, nucleus making agent, antistatic agent, ultraviolet absorber, aging resistor, flame retardant, dyne, pigments mold releasing agent, and the like.

First, the lubricant is explained among the additives. As the lubricant increases flowability of the thermoplastic resin, the moldability of the molded plastic parts and dispersibility of the light-shielding materials become better. The typical lubricants are enumulated as follows.

1. Fatty acid amide type lubricant

[Saturated Fatty Acid Amide Lubricants]

(1) Behenic acid amide lubricant; DIAMID KN (trade name, manufactured by Nippon Kasei).

(2) Stearic acid amide lubricant; AMIDE HT (Lion Fat & Oil), ALFLOW S-10 (trade name, manufactured by Nippon Oils & Fats), FATTY AMIDE S (trade name, manufactured by Kao), DIAMID 200 (trade name, manufactured by Nippon Kasei), DIAMID AP-1 (trade name, manufactured by Nippon Kasei), AMIDE S and AMIDE T (trade name, manufactured by Nitto Chemical), NEWTRON-2 (trade name, manufactured by Nippon Fine Chemical).

[Unsaturated Fatty Acid Amide Lubricants]

(1) Erucic acid amide lubricant; ALFLOW P-10 (trade name, manufactured by Nippon Oils & Fats), NEWTRON—S (trade name, manufactured by Nippon Fine Chemical), LUBROL (trade name, manufactured by I.C.I), DIAMID L-200 (trade name, manufactured by Nippon Kasei).

(2) Oleic acid amide lubricant; ARMO SLIP-CP (trade name, manufactured by Lion Akzo), NEWTRON (trade name, manufactured by Nippon Fine Chemical), NEWTRON E-18 (trade name, manufactured by Nippon Fine Chemical), AMIDE O (trade name, manufactured by Nitto Chemical), DIAMID O-200 and DIAMID G-200 (trade name, manufactured by Nippon Kasei), ALFLOW E-10 (trade name, manufactured by Nippon Oils & Fats), FATTY AMIDE O (trade name, manufactured by Kao).

[Bis Fatty Acid Amide Lubricants]

(1) Methylene bis-behenic acid amide lubricant; DIAMID NK BIS (trade name, manufactured by Nippon Kasei).

(2) Methylene bis-stearic acid amide lubricant; DIAMID 200 BIS (trade name, manufactured by Nippon Kasei), ARMO WAX (trade name, manufactured by Lion Akzo), BIS AMIDE (trade name, manufactured by Nitto Chemical).

(3) Methylene bis-oleic acid amide lubricant; LUBRON O (trade name, manufactured by Nippon Kasei).

(4) Ethylene bis-stearic acid amide lubricant; ARMO SLIP EBS (trade name, manufactured by Lion Akzo).

(5) Hexamethylene bis-stearic acid amide lubricant; AMIDE 65 (trade name, manufactured by Kawaken Fine Chemical).

(6) Hexamethylene bis-oleic acid amide lubricants; AMIDE 60 (trade name, manufactured by Kawaken Fine Chemical).

2. Hydrocarbon lubricants; liquid paraffin, natural paraffin, micro wax, synthetic paraffin, polyethylene wax, polypropylene wax, chlorinated hydrocarbon, and fluorocarbon. As to the polyethylene wax and the polypropylene wax, average molecular weight is less than 10,000, preferable less than 8,000, especially less than 6,000.

3. Fatty acid lubricants; higher fatty acid (whose preferable number of carbon atoms is C12 or more, for example, stearic acid, oleic acid, erucic acid, palmitic acid), and oxy fatty acid.

4. Ester lubricants; fatty acid lower alcohol ester, fatty acid polyvalent alcohol ester, fatty acid polyglycol ester, and fatty acid fatty alcohol ester.

5. Alcohol lubricants; polyvalent alcohol, polyglycol, polyglycerole, and the like.

6. Fatty acid metal salt lubricants (metallic soaps); compounds of fatty acids and metals. The fatty acids are, for example, caproic acid, caprylic acid, capric acid, lauric acid, myristic acid, stearic acid, succinic acid, behenic acid, linolic acid, stearyl lactic acid, lactic acid, phthalic acid, benzoic acid, hydroxy stearyl acid, ricinoleic acid, naphthenic acid, oleic acid, erucic acid, palmitic acid, montanic acid, erucin, and the like. As to these, number of carbons is 6–50, preferably 10–40, especially 10–30. The metals are, for example, Li, Na, Mg, Ca, Sr, Ba, Co, Ni, Zn, Cd, Al, Sn, and Pb. Preferable compounds are sodium stearate, magnesium stearate, calcium stearate, zinc stearate, magnesium oleate, calcium oleate, zinc oleate, calcium palmitate and the like.

7. Silicone lubricants; dimethyl polysiloxane, polymethyl phenyl siloxane, olefin modified silicone, amide modified silicone, amino modified silicone, carboxyl modified silicone, epoxy modified silicone, α-methyl styrene modified silicone, alcohol modified silicone, polyether modified silicone modified with polyethylene gricol or polypropylene gricol, olefin/polyether modified silicone, polydimethyl siloxane, and the like. All of them are applied to the present invention.

Fatty acid metal salt is preferably used in the present invention because it bonds with halide in the resin or remainder of the catalysis to neutralize the resin and improves dispersibility of the light-shielding materials. Accordingly, the fatty acid improves photographic characteristic of the photosensitive materials, antirust effect of a metallic mold, a screw or a cylinder of an injection molder, and prevents acne.

Silicone lubricants are preferable only in view of physical strength, flowability, lubricity, and time for molding, and also hardly have a bad influence on the photographic characteristics of the photosensitive material. By using the silicone lubricants, the light-shielding materials disperse in the resin better and cause haze (ASTM D-1003) larger so as to make the resin clouding in white. Accordingly, the resin is colored more effectively and the light-shielding ability is improved.

Especially preferable among the silicone lubricants are dimethylpolysiloxane and polymethyphenylsiloxane. They include mostly straight chain diorganopolysiloxane. In view of an influence on the photosensitive property, physical strength, light-shielding ability, lubricity, moldability and the like, further preferable is the dimethylpolysiloxane whose coefficient viscosity is between 50–100,000 centistorks at 23. Considering easiness of treatment, photographic characteristic and cost, the coefficient is preferable between 5000–100000. If the coefficient is less than 50 centistorks, the photosensitive property becomes worse and breeding out becomes more prominent. The coefficient of more than 100,000 centistorks causes the produce to become too hard to easily produce the molded plastic parts, which increases the cost.

Some silicone lubricants increases the lubricity and scarcely have a bad influence on the photosensitive materials, for example olefin modified silicone, amide modified silicone, polydimethyl silicone, polyether modified silicone, olefin/phlyether modified silicone, carboxyl modified silicone.

These silicone oils improve the physical strength of the molded plastic parts, surface hardness, shorten the time for molding, and reduce friction coefficient to decrease a slide resistance, which causes the molded plastic parts to obtain a wonderful appearance without weldline and short shot and have a high accuracy of size and a high abrasion resistance and durability. Therefore, the camera in which the molded plastic parts are used has excellent properties with small resistance for film winding, and the luster of the camera is hardly reduced.

The silicone oils described above have preferably a coefficient of viscosity between 1,000–100,000 centistrokes, particularly between 3,000–60,000 centistrokes, especially 5,000–30,000 centistrokes. The content of the additives is, which depends on purpose for using, 0.01–5.0 wt. %, preferably 0.02–4.0 wt. %, particularly 0.03–3.0 wt. %, and especially 0.04–2.0 wt. %.

Only one or more than two of the silicone lubricants may be used with other lubricants or the plasticizer in the invention. Effects of the silicone oils are enumerated as follows:

(1) improvement of flowability of resin, decrease of load of the motor, prevention of melt fracture;

(2) obtainment of lubricity without adding lubricants such as fatty acid amide which causes bleeding out;

(3) improvement of the light-shielding ability by clouding the molded plastic parts in white;

(4) improvement of the physical strength;

(5) improvement of surface hardness, abrasion resistance, and durability.

The content of the above-described lubricants is, which is dependent on kinds of resins or lubricants and purpose of use, between 0.01–5.0 wt. %, preferably 0.02–4.0 wt. %, particularly 0.03–3.0 wt. %, especially 0.04–2.0 wt. %, and most especially 0.03–1.0 wt. %.

Oxidation inhibiting materials will be explained. The antioxidants prevent the deterioration of heat of the thermoplastic resin and the heat decomposition of each of the additives. Accordingly, flowability of the thermoplastic resins does not remarkably change and the acne hardly occurs, which prevents the photo film from fogging and being scratched.

Oxidation inhibiting materials include antioxidants, radical terminators, hydrotalcite compounds and oxidation inhibiting synergists. The oxidation inhibiting synergists are often used with the other oxidation inhibiting material to increase the antioxidant effects. It is preferable that one of them is added in the resin used for photosensitive materials.

Some already-known compounds, such as hydrazine compounds, urea compounds, are preferably added to the oxidation inhibiting materials in view of decreasing the photographic characteristic of the photosensitive materials, and stabilizations of chemical reaction and absorption.

The content of the oxidation inhibiting material is 0.001–1.0, preferably 0.005–0.7 wt. %, particularly 0.01–0.45 wt. %, especially 0.02–0.3 wt. %. If the content is less than 0.001 wt. %, there are not enough effects of the added oxidation inhibiting materials. If the content is more than 1.0 wt. %, bleeding out often occurs on the surface of the molded plastic parts. Further, the photographic characteristic of the photosensitive materials is damaged more, as the oxidation-reduction of the photosensitive material is utilized. Further, the resin plateouts on the metallic mold, which makes the appearance of the molded plastic part worse, and fuming happens more to make the milieu of the fabric worse.

The typical oxidation inhibit materials are enumerated as follows:

(a) Phenol-Based Antioxidants:

Vitamine E (tocopholol); tocopholol dipolymers (α-tocopholol, b-tocopholol, 5,7,-tocopholol); 6-tert-butyl-3-methylphenyl derivatives; 2,6-di-tert-butyl-p-cresol; 2,2'-methylenebis-(4-ethyl-6-tert-butylphenol); 4,4'-butylidenebis(6-tert-butyl-m-cresol); 4,4'-thiobis(6-tert-butyl-m-cresol); 4,4'-dihydroxydiphenylcyclohexane; alkylated bisphenol; styrenated phenol; 2,6-di-tert-butyl-4-methylphenol; n-octadecyl-3-(3',5'-di-tert-butyl-4'-hydroxyphenyl)propionate; 2,2'-methylenebis(4-methyl-6-tert-butylphenol); 4,4'-thiobis (3-methyl-6-tert-butylphenol); 4,4'-butylidenebis(3-methyl-6-tert-butylphenol); stearyl-β-(3,5-di-4-butyl-4-hydroxyphenyl)propionate; 1,1,3-tris(2-methyl-4-hydroxy-5-tert-butylphenyl)butane; 1,3,5-trimethyl-2,4,6-tris(3,5-di-tert-butyl-4-hydroxybenzyl)benzene; and tetrakis[methylene-3-(3',5'-di-tert-butyl-4'-hydroxyphenyl)propionate]methane.

(b) Ketone Amine Condensate-Based Antioxidants:

6-ethoxy-2,2,4-trimethyl-1,2-dihydroquinoline; polymers of 2,2,4-trimethyl-1,2-dihydroquinoline; and trimethyldihydroquinoline derivatives.

(c) Allylamine-Based Antioxidants:

Phenyl-α-naphthylamine; N-phenyl-β-naphthylamine; N-phenyl-N'-isopropyl-p-phenylenediamine; N,N'-diphenyl-p-phenylenediamine; N,N'-di-β-naphthyl-p-phenylenediamine; and N-(3'-hydroxybutylidene)-1-naphthylamine.

(d) Imidazole-Based Antioxidants:

2-mercaptobenzoimidazole; 2-mercaptobenzo-imidazole zinc salt; and 2-mercaptomethylbenzoimidazole.

(e) Phosphite-Based Antioxidants:

Alkylated allylphosphite; diphenylisodecylphosphite; tris (mono-/or dinonylphenyl)phosphite; cyclic neopntane tetrayl-bis(2,6-di-tert-butyl-4-methylphenyl)-phosphite; sodium tris(nonylphenyl)phosphine phosphite; tri(nonylphenyl)phosphite; 2,2-methylenebis(4,6,di-tert-butylphenyl)octyl phosphite; tris(2,4-di-tert-butylphenyl) phosphite and triphenyl phosphite.

(f) Thiourea-Based Antioxidants:

Thiourea derivatives; and 1,3-bis(dimethylamino-propyl)-2-thiourea.

(g) Other Antioxidants Useful for Air Oxidation:

Dilauryl thiodipropionate.

Preferable are phenol-based antioxidants and phosphite-based antioxidants, as they scarcely have a bad influence on the photosensitive material, and their anti-oxidant action is effectively made. Especially, by using phenol-based antioxidants, bleeding out rarely occurs and the light shielding ability is improved, which are merits beyond expectation. The resin is not damaged in high temperature, and the amount of fume is decreased.

In the phenol-based antioxidants, especially preferable are hindered phenol-based antioxidants. Typical hindered phenol-based antioxidants are described bellow:

1,3,5-trimethyl-2,4,6-tris(3,5-di-tert-butyl-4-hydroxybenzyl)benzene; tetrakis[methylene-3-(3',5'-di-tert-butyl-4'-hydroxyphenyl)propionate]methane; octadecyl-3,5-di-tert-butyl-4-hydroxy-hydrocinnamate; 2,2',2'-tris[(3,5-di-tert-butyl-4-hydroxyphenyl) propionyloxy]ethylisocyanurate; 1,3,5-tris(4-tert-butyl-3-hydroxy-2,6-methylbenzyl)isocyanate; tetrakis(2,4-di-tert-butylphenyl)-4,4'-biphenylenediphosphite ester 4,4'-thiobis(6-tert-butyl-o-cresol);
2,2'-thiobis(6-tert-butyl-4-methylphenol);
tris-(2-methyl-4-hydroxy-5-tert-butylphenyl)butane;
2,2'-methylene-bis(4-methyl-6-tert-butylphenol);
4,4'-methylene-bis(2,6-di-tert-butylphenol);
4,4'-butylidenebis(3-methyl-6-tert-butylphenol);
2,6-di-tert-butyl-4-methylphenol;
4-hydroxymethyl-2,6-di-tert-butylphenol;
2,6-di-tert-4-n-butylphenol;
2,6-bis(2'-hydroxy-3'-tert-butyl-5-methylbenzyl)-4-methylphenol;
4,4'-methylenebis(6-tert-butyl-o-cresol);
4,4'-butylidene-bis(6-tert-butyl-m-cresol); and
3,9,bis[1,1-dimethyl-2-[β-(3-t-butyl-4-hydroxy-5-methylphenyl)propionyloxy]ethyl]2,4,8,10-tetraoxaspiro[5,5] undecane.

The antioxidants above described becomes more effective when used with phosphorus-based antioxidants. Further, more than three kinds of antioxidants, including at least one of the phosphorus-based antioxidants, at least one of the hindered phenol-based antioxidants, and at least hydrotalcite compounds, are preferably mixed.

Vitamine E (tocophelol) and tocophelols dipolymer (α-tocophelol, b-tocophelol, 5,7,-tocophelol) have excellent antioxidant action, and improves the dispersibility and the light-shielding ability of the light-shielding material when the molded plastic parts are colored in yellow.

Accordingly, more than 10% of the amount of the light-shielding materials added in the resin can be reduced. Also in this case, the light-shielding ability is as same as when only the light-shielding materials such as black carbons are added. Further, there are merits such as decrease of cost (number of the materials and parts) for production, improvement of physical strength and appearance, and prevention from decrease of the photographic characteristic.

As the phenol-type antioxidants on market, there are IRGANOX (manufactured by Ciba Geigy, for example Ireganox 1010, Ireganox 1076); Sumilizer BH-T, Sumilizer BP-76, Sumilizer-WX-R, Sumilizer BP-101 (manufactured by Sumitomo Chemical) and the like. Further, there are merits when one or more sorts of the following materials are used at the same time: 2,6-di-butyl-p-cresol (BHT), high molecular weight phenol type antioxidants of low volatility (trade name: Ireganox 1010, Ireganox 1076, Topanol CA, Ionox 330, and the like), diuralylthiodipropionate, distearyl-thiopropionate, dialkylphosphate, and the like.

Plural kinds of the antioxidants are often mixed and used, for example, hindered phenol-based antioxidants and pentaerythritol phosphate compounds-based antioxidants, hindered phenol-based antioxidants and diorganicpentaerythritol diphosphite compounds-based antioxidants, hindered phenol-based antioxidants and phosphic acid ester-based antioxidants, and organicphosphic acid ester-based antioxidants. There are mixtures of more than two kinds of the following antioxidants: alkyl substituted monophenol-based antioxidants, alkyl substituted polyphenol-based antioxidants, organic phosphite compounds-based antioxidants, and organic phosphic acid ester-based antioxidants.

The hindered-based antioxidants tend to be deterionated by heat. However, they improve the dispersibility and the photographic characteristic of the photosensitive materials, neutralize the recesses of the catalysts, prevent heat deterioration of metallic salt of fatty acid such as zinc stearate, calcium stearate, and can enormously decrease the number of acnes. Further, the photographic characteristic of the photosensitive material is improved by using the hindered-based antioxidants.

Especially, at least one of the hindered phenol-based antioxidants and at least one of phosphorus-based antioxidants may be used at the same time, which improve the effect of preventing the heat deterioration of the resin and additives. The hindered phenol-based antioxidant is a representative radical terminator whose melting point is higher than 100, preferably higher than 120, and the phosphorus-based antioxidant is a decomposer for a peroxide compounds.

When the molecular weight of the hindered phenol-based antioxidants and the phosphorus-based antioxidants is more than 200, preferably more than 300, particularly more than 400, especially more than 500, there are many merits, for example they have small bad influences on the light-shielding materials, decrease heat decomposition even in the temperatures (130–400) where the resins melt, and continuously prevent bleeding out.

The following radical terminator is preferably contained in the resins used for the photosensitive materials: 1,1-diphenyl-2-picrilhydrazyl, 1,3,5-triphenylferdazine, 2,2,6,6-tetramethyl-4-piperidone-1-oxyl, N-(3-N-oxyanilino-1,3-dimethylbutylidene)-anilineoxide, high valenz metallic salt such as iron chloride, diphenylpicrylhydrazine, diphenylamine, hydroquinone, t-butylcatechol, dithiobenzoildisulfide-p,p'-ditriltrisulfide, benzoquinone derivatives, nitro compounds, nitroso compounds, and the like.

Especially, the hydroquinon is used. Moreover, the above-mentioned radical derivatives may be used independently, or can also use some kinds together. The content of added radical terminator is 0.001–1.0 wt. %, preferably 0.005–0.7 wt. %, especially preferably 0.01–0.45 wt. %. Furthermore, it may be also suitable to use together one or more sorts of antioxidants, an oxidization prevention synergist, and an aging prevention agent.

The oxidation inhibiting synergists will be explained. The oxidation inhibiting synergist, when used with one or more sorts of the antioxidants, the radical terminators or the hydrotarcite compounds, prevents heat deterioration of and heat decomposing of resin or additives of low molecular weight (lubricants, antistatic agent, organic nucleus making agent, compatibilizer, and the like), and further inhibits remarkable change of flowability of resin and reduction of the physical strength, or it can prevent that the gate stick or the short shot occur, and that the decomposed products having bad influences on the photosensitive materials are produced in high temperature.

As the oxidization prevention synergists which carry out such effects, there are phosphoric acid, citric acid, phosphoric acid compounds, and the like. Especially, phosphoric acid metallic salt and citric acid metallic salt are used. The content of them is 0.001–1.0 wt. %, preferably 0.005–0.7 wt. %, especially preferably 0.01–0.45 wt. %. They are not effective when the content is less than 0.001 wt. %, and their effects co not increase so much when the content is more than 1.0 wt. %, which increase the cost for production.

The hydrotalcites are now explained. In order to neutralize the recess of catalysts, absorb halogens such as chlorine to remove the bad effects of them, and prevent resin burning. One or both of the hydrotalcite and the fatty acid metallic salts are added in the resin for the molded plastic parts such that the content of them may be 0.001–5.0 wt. %, preferably 0.005–4.0 wt. %, particularly 0.01–3.0 wt. %, especially 0.02–2.0 wt. %. The hydrotalcites are not effective when their content is less than 0.001 wt. %, and the effects become so large when the content is more than 5.0 wt. %, which increase the cost for production.

The hydrotalcite is a double salt whose general formula is shown as follows:

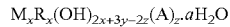

[M is Mg, Ca, or Zn, R is Al, Cr or Fe, A is $CO_3$, or $HPO_4$, x, y, z, a are positive integers.]

The representative examples are $Mg_6Al_2(OH)_{16}CO_3.4H_2O$, $Mg_8Al_2(OH)_{20}CO_3.5H_2O$, $Mg_5Al_2(OH)_{14}CO_3.4H_2O$, $Mg_{10}Al_2(OH)_{22}(CO_3)_2.4H_2O$, $Mg_6Al_2(OH)_{16}HPO_4.4H_2O$, $Ca_6Al_2(OH)_{16}CO_3.4H_2O$, $Zn_6Al_2(OH)_{16}CO_3.4H_2O$, $Mg_{4.5}Al_2(OH)_{13}.3.5H_2O$, and the like.

Further, the hydrotalcite have also the following general formula:

[M is alkaline earth metal or zinc. X is an anion having n of ion valency.

And x, m and n satisfy the following conditions.

According to the hydrotalcite represented in the above formula, n is integer between 1 and 4. The reflexive index of such hydrotalcite is 1.40–1.55 (measured in oil immersion of Larsen).

The anions according to the above formula are, for example $Cl^-$, $Br^-$, $I^-$, $NO_3^-$, $ClO_4^-$, $SO_4^-$, $CO_3^{2-}$, $SiO_3^{2-}$, $HPO_4^{2-}$, $HBO_3^{2-}$, $PO_4^{3-}$, $Fe(CN)_6^{3-}$, $Fe(CN)_6^{2-}$, $CH_3COC^-$, $C_6H_4(OH)COO^-$.

The preferable examples are shown below.

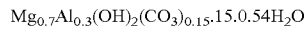

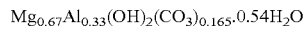

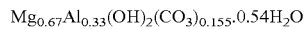

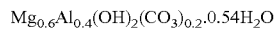

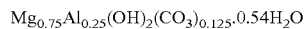

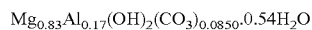

The hydrotalcites may be natural or synthetic products. The hydrotalcites contain magnesium, aluminum, and the like, as main components, and effectively absorb halides such as chloride that may have bad influences on the photographic character, and the rust of metal used for molding, and further absorb and stabilize the monomers in the thermoplastic resins and the volatile materials that are contained in the additives and damage the photographic characteristic. The hydrotalcites are produced in conventional arts disclosed in Japanese Patent Laid-open Publication Number S46-2280 and S50-30039.

Especially, the hydrotalcites described above are preferable, and structures and diameters of particles of their crystals are not restricted. As the natural products of the hydrotalcite, there are hydrotalc stone, stichtite, pirolite, and the like. Such hydrotalcite may be used independently, or two or more sorts of them may be also used together.

The hydrotalcites are preferably used with the antioxidants described above and fatty acid metallic salt described below. They due to prevent damaging the photographic characteristics and improve the dispersibility of the light-shielding materials and the hydrotalcites. In order to improve processability, especially physical properties, the averaged diameter of secondary particle is less than 20 μm, preferably less than 10 μm, especially less than 5 μm. BET ratio surface is bellow 50 $m^2$/g, preferably 40 $m^2$/g, especially 30 $m^2$/g.

The hydrotalcite compounds are preferably used, after processed with the surface treatment materials. Thus, the dispersibility, affinity, physical strength, and moldability are improved.

Some of such surface treatment materials have been already enumerated in (1)–(20) that are used for coating the surfaces of the light-shielding material particles. Especially preferably, they prevent resting, and make heavy metal and recess of catalyst harmless that originally have bad influences on the photosensitive materials. There are for example higher fatty acid metal salts, such as sodium laurate, potassium laurate, sodium oleate, potassium oleate, zinc oleate, calcium oleate, calcium stearate, magnesium stearate, sodium stearate, zinc stearate, potassium stearate, calcium palmitate, sodium palmitate, potassium palmitate, sodium caprate, potassium caprate, sodium milistate, potassium milistate, sodium linolate, potassium linolate.

Further, there are higher fatty acid, organic sulfonic acid metallic salt coupling agents, higher fatty acid amides, higher fatty acid esters, silicon, waxes that are lubricants. The higher fatty acids are lauric acid, palmitic acid, oleic acid, stearic acid, capric acid, milistic acid, linoleic acid, and the like. As the organic sufonic acid metallic salts, there are calcium dodecylbenzensulfonate, sodium dodecylbenzensulfonate, and the like. As the coupling agent, there are: isopropyltriimestearoiltitanate, isopropyltris(dioctylpilophosphate)titanate, tetraisopropylbis(dioctylphosphite)titanate, vinyltrietoxysilane, γ-glycidoxy-propyltrimethoxysilane.

There are some methods of surface covering. For example, a water solution of higher fatty acid alkali metallic salts is dropped into suspension of warm water and hydrotalcite with agitating, or diluted solution of higher fatty acids or coupling agent is dropped onto powder of the hydrotalcite being agitated with mixing apparatus, such as Henschel mixer and the like.

The amount of the surface treatment materials can be changed and adjusted between 0.01–50 parts by weight, preferably 0.05–35 parts by weight, particularly 0.1–20 parts by weight, especially 0.5–10 parts by weight, in accordance with 100 parts by weight of the hydrotalcites. The surface treatment material may contain a little amount of impurities such as the metal oxide so far as the objects of the present invention are achieved.

In order to disperse the hydrotalcites more effectively, one or more kinds of dispersing agents can be added in the resin so that their content may be 0.01–5 wt. %, preferably 0.05–4 wt. %, particularly 0.08–3 wt. %, especially 0.1–2 wt. %. As such dispersing agents, there are higher fatty acid, fatty amide-based lubricant, sorbitan fatty acid ester such as sorbitan monostearate and silicone oil, glycerin fatty acid such as glycerin monostearate.

By using the surface treatment agent with hydrotalcites, the photographic characteristic is prevented from damaging, the moldability is improved, the injection molding apparatus works more effectively, the mold is hardly rusted, the molded plastic part become more penetrate. Further, the physical strength is prevented from reducing, and some effects of preventing the coloring failure and the acne that occurs by burning are mutually improved. It is preferable to use the surface treatment agent with one or more kinds selected from the phenol-based antioxidants, the phosphorus-based antioxidants, and the fatty acid-based antioxidants. Because the photographic characterictic of the photosensitive material rarely becomes low, the injection molding apparatus works more effectively, and the mold is more hardly rusted.

In order to prevent damaging the photosensitive material in accordance with the photographic characteristic, the molded plastic part contains the following agents:

(1) phenol-based antioxidants between 0.0005–0.5 wt. %, preferably 0.001–0.4 wt. %, especially 0.002–0.3 wt. %:

(2) phosphorus-based antioxidants between 0.0005–0.5 wt. %, preferably 0.001–0.4 wt. %, especially 0.002–0.1 wt. %:

(3) one or more sorts of hydrotalcite and fatty acid matellic salt (metallic soap) between 0.001–5 wt. %, preferably 0.005–4 wt. %, especially 0.01–3 wt. %. Total content of (1), (2), and (3) is preferably between 0.0015–6 wt. %, preferably 0.002–5 wt. %, particularly, 0.003–4 wt. %, especially, 0.005–3 wt. %. Preferably, the smallest amount of the additive is contained in the molded plastic part to prevent reducing the photographic characteristic, bleeding out, and increasing cost.

The fatty acid metal salt is explained. The fatty acid metal salt is preferably used with the hydrotalcite, has same excellent effect as the hydrotalcite, and improves the flowability of the resin, dispesibility of the lubricant and the light-shielding material.

As the representative fatty acids, there are compounds of higher fatty acids and metals. The higher fatty acids are for example lauric acid, stearic acid, succinic acid, stearyl-lactic acid, lactic acid, phthalic acid, benzoic acid, hydroxystearic acid, resinolic acid, naphthenic acid, oleic acid, palmitic acid, erucic acid. The metals are lithium, sodium, magnesium, calcium, barium, strontium, lead, cadmium, aluminum, zinc, and tin. Preferable are calcuium stearate, magnesium stearate, sodium stearate, zinc stearate, calcium olate, zinc stearate, and magnesium olate.

The nucleus making agents are now explained. The nucleus making agents are categorized in organic nucleus making agents and inorganic nucleus making agent. One or more sorts of the organic and inorganic nucleus making agents are added in the resin used for the molded plastic parts. Thus, surface hardness, rigidity, izod impact strength and abrasion resistance are improved. Further, when the nucleus making agents are added in the polyolefin resin of the crystalline resin, especially homopolyethylene resin, ethylene-α-olefin copolmer resin, propylene-α-olefin copolymer resin, transparency, cristalizing velocity, and moldability of them are improved.

Total content of one or more sorts of the organic or inorganic nucleus making agents is 0.001–10 wt. %, preferably 0.005–8 wt. %, especially 0.01–5 wt. %. If the content is below 0.001 wt. %, effects of the nucleus making agents are not enough (rigidity, productivity, heat resistance, and hardness are not improved). However, the cost becomes higher. When the too large amount of the nucleus making agent is added, fuming more frequently occurs in production, and bleeding out occurs on the surface of the molded plastic parts, which make the appearance worse. Furthermore, white powders sticks on the photosensitive layer of the photosensitive materials and causes difficulty of development.

As the representative inorganic nucleus making agents, there are some clay-type materials, metal chloride, and inorganic salts. The clay type materials are for example talc, clay, mica, montmorillonite, and bentonite. The metal chloride is calcium silicate, magnesium silicate, calcium sulfate, barium sulfate, lithium carbonate, sodium carbonate, sodium hydrocarbonate, potassium hydrocarbonate, calcium carbonate, magnesium carbonate, lithium hydroxide, sodium hydroxide, calcium hydroxide, potassium hydroxide, magnesium hydroxide, barium hydroxide, and the like. The inorganic salts are sodium oxide, calcium oxide, magnesium oxide, alumina, titanium oxide, iron oxide, zinc oxide, and the like.

As the organic nucleus agents, there are carboxylic acids dicarboxylic acid, their salts, anhydride, aromatic sulphonic acid salt and ester, aromatic phosphinic acid, aromatic phosphonic acid, aromatic carboxylic acid, salt of other acids and aluminum, aromatic phosphoric acid metal salt, alkyl akchol having 8–30 carbons, condensation of multi-valence alcohol and aldehyde, and alkylamine.

The carboxylic acids includes their derivatives, for example acrylic acid, methacrylic acid, maleic acid, fumaric acid, itaconic acid, tetrahydrophthalic acid, mesaconic acid, angelic acid, citraconic acid, crotoninc acid, isocrotonic acid, nadic acid, (endocis-bicyclo[2,2,1]hept-5-ene-2,3-dicarboxylic acid), maleic anhydride, citraconic anhydride, itaconic anhydride, methyl acrylate, butyl methacrylate, ethyl acrylate, ethyl methacrylate, butyl acrylate, butyl methacrylate, glycidyl acrylate, glycidyl methacrylate, maleic acid monoethyl ester, maleic acid diethyl ester, fumaric acid monomethyl ester, fumaric acid dimethyl ester, itaconic acid diethyl ester, acrylic acid amide, methacrylic acid amide, maleic acid monoamide, maleic acid diamide, maleic acid-N-monoethyl amide, maleic acid-N,N-diethyl amide, maleic acid-N-monobutyl amide, maleic acid-N,N-dibutyl amide, fumaric acid monoamide, fumaric acid diamide, fumaric acid-N-monoethyl amide, fumaric acid-N,N-diethyl amide, fumaric acid-N-monobutyl amide, fumaric acid-N,N-dibutyl amide, maleimido, monomethyl maleinate, dimethyl maleinate, potassium methacrylate, sodium acrylate, sodium methacrylate, potassium acrylate, potassium methacrylate, N-butylmaleimido, N-phenylmaleimido, malenyl chloride, glycidine maleinate, dipropylmaleinate, aconitic anhydride, sorbic acid, and the like.

The organic nucleus making agent can be used with other organic or inorganic ones. Further, the surface of one or more organic and inorganic nucleus making agents are covered with the lubricant, the dispersing agent or the moisture agent. As the lubricant, there are fatty acids, fatty acids compounds and silicone. The dispersing agent and the moisture agent include the surface treatment agent for the light-shielding material, such as coupling agent, plasticizer, and surface active agent. It is preferable to dibenzylidene-sorbitol covered with one or more sorts of plasticizer and higher fatty acid compounds.

Among the nucleus making agents, the sorbitol derivatives are preferably used. As not causing the decomposed products, they have no bad influence on the photographic characteristic of the photosensitive materials. Further, nucleuses are most effectively made, time for molding are shortened, and molding failure is reduced.

The representative sorbitols are especially preferably used:
di-(o-methylbenzylidene)sorbitol
o-methylbenzylidene-p-methylbenzylidenesorbitol
di-(o-methylbenzylidene)sorbitol
m-methylbenzylidene-o-methylbenzylidenesorbitol
di-(o-methylbenzylidene)sorbitol
m-methylbenzylidene-p-methylbenzylidenesorbitol
1,3-heptanylidenesorbitol
1,3/2,4-diheptanylidenesorbitol
1,3/2,4-di(3-nonyl-3-pentenylidene)sorbitol
1,3-cyclohexanecarbylidenesorbitol
1,3/2,4-dicyclohexanecarbylidenesorbitol
1,3/2,4-di(p-methylcyclohexanecarbylidene)sorbitol
Aromatic hydrocarbon groups or derivatives thereof
1,3-benzylidenesorbitol
1,3/2,4-dibenzylidene-D-sorbitol
1,3/2,4-di(m-methylbenzylidene)sorbitol
1,3/2,4-di(p-methylbenzylidene)sorbitol
1,3/2,4-di(p-hexylbenzylidene)sorbitol
1,3/2,4-di(1-naphthalenecarbylidene)sorbitol
1,3/2,4-di(phenylacetylidene)sorbitol
1,3/2,4-di(methylbenzylidene)sorbitol
1,3/2,4-di(ethylbenzylidene)sorbitol
1,3/2,4-di(propylbenzyledene)sorbitol
1,3/2,4-di(methoxybenzylidene)sorbitol
1,3/2,4-di(ethoxybenzylidene)sorbitol
1,3/2,4-di(p-methylbenzylidene)sorbitol
1,3/2,4-di(p-chlorbenzylidene)sorbitol
1,3/2,4-di(p-methoxybenzylidene)sorbitol
1,3/2,4-di(alkilbenzylidene)sorbitol
1,3/2,4-di(methybenzylidene)sorbitol aluminumbenzoate, and the like.

The antistatic agents having characteristics of surfactants will be explained in following. The antistatic agent is preferably added into the resin compounds in order to keep the antistatic property of the molded plastic part. The representative antistatic agents are described below:

1. Nonionic (1) Alkylamine derivatives; T-B103 (trade name, manufactured by Matsumoto Yushi), and T-B104 (trade name, manufactured by Matsumoto Yushi).
Alkylamide types
Tertiary amine(laurylamine); Armostat 400 (trade name, manufactured by Lion Fat & Oil).
N,N-bis(2-hydroxyethylcocoamine); Armostat 410 (trade name, manufactured by Lion Fat & Oil).
Tertiary amine; ANTISTATIC 273C, 273 and 273E (trade name, manufactured by Fine Org. Chem.).
N-hydroxyhexadecyl-di-ethanol-amine; Belg. P. 654,049.
N-hydroxyoctadecyl-di-ethanol-amine; National Dist.

(2) Fatty acid amide derivatives; TB-115 (trade name, manufactured by Matsumoto Yushi), Elegan P100 (trade name, manufactured by Nippon Oils & Fats), and Erik SM-2 (trade name, manufactured by Yoshimura Yukagaku).
Hydroxystearic amide.
Oxalic-N,N'-distearylamidebutylester.
Polyoxyethylenealkylamide.

(3) Ether types
Polyoxyethylenealkyl ether
$RO(CH_2CH_2O)_nH$
Polyoxyethylenealkyl phenyl ether;
Special nonionic types: Resistat 104, PE100, 116–118, PE 132 and 139, Elegan E115, Chemistat 113 (trade name, manufactured by Dai-ichi Kogyo Seiyaku), Chemistat 1005

(trade names, manufactured by Nippon Oils & Fats), Erik BM-1 (trade name, manufactured by Yoshimura Yukagaku), and ELECTROSTRIPPER TS-2B, TS-2PA, TS-3B, TS-5, TS-6B, TS-7B, TS-8B, TS-9B, HS-12N, HS-12PA, EA (trade name, manufactured by Kao Soap).

(4) Polyhydric alcohol ester types

Glycerine fatty acid ester: mono-, di- or triglyceride of stearic acid or hydroxystearic acid, monoglyceride (manufactured by Nippon Shono), TB-123 (trade name, manufactured by Matsumoto Yushi), and Resistat 113 (trade name, manufactured by Dai-ichi Kogyo Seiyaku).

Sorbitan fatty acid ester

Special ester; Erik BS-1 (trade name, manufactured by Yoshimura Yukagaku).

1-Hydroxyethyl-2-dodecylglyoxazoline (manufactured by British Cellophane).

2. Anionic (1) Sulfonic acids;

Alkylsulfonate, $RSO_3Na$, Alkylbenzenesulfonate, Alkylsulfate, and $ROSO_3Na$.

(2) Phosphoric ester type;

Alkyl phosphate.

3. Cationic (1) Amide type cation; Resistat PE300, 401, 402, 406 and 411 (trade name, manufactured by Dai-ichi Kogyo Seiyaku).

(2) Quaternary ammonium salts;

Quaternary ammonium chloride, Quaternary ammonium sulfate, Quaternary ammonium nitrate.

Catimin CSM-9 (trade name, manufactured by Yoshimura Yukagaku), CATANAC 609 (trade name, manufactured by American Cyanamide), Denon 314C (trade name, manufactured by Marubishi Yuka), Armostat 300 (trade name, manufactured by Lion Fat & Oil), 100V (trade name, manufactured by ARMOR), ELECTROSTRIPPER ES (trade name, manufactured by Kao Soap), and Chemistat 2009 (trade name, manufactured by Nippon Oils & Fats), Stearamido propyl-dimethyl-β-hydroxyethyl ammonium nitrate.

CATANAC-SN (trade name, manufactured by American Cyanamide).

4. Ampho-Ionic (1) Alkylbetaine type;

(2) Imidazoline types; Leostat 53 and 532, AMS 53, AMS 303 and 313 (trade name, manufactured by Lion Fat & Oil);

Alkylimidazoline type.

(3) Metal salt types

AMS 576 (trade name, manufactured by Lion Fat & Oil)

Leostat 826 and 923 (trade name, manufactured by Lion Fat & Oil)

$(RNR'CH_2CH_2CH_2NCH_2COO)_2Mg$ (manufactured by Lion Fat & Oil) in which $R \geq C$, $R'=H$ or $(CH_2)_mCOO-$, R=hydrocarbon having 3–6 carbons, A=oxygen or an imino group, and M=organic amine or metal.

(4) Alkyl alanine type

5. Others

Resistat 204 and 205 (trade name, manufactured by Daiichi Kogyo Seiyaku), Elegan 2E and 100E (trade name, manufactured by Nippon Oils & Fats), Chemistat 1002, 1003 and 2010 (trade name, manufactured by Nippon Oils & Fats), Erik 51 (trade name, manufactured by Yoshimura Yukagaku), and ALROMIME RV-100 (trade name, manufactured by Geigy). Further, it is possible to select from various antistatic agents disclosed in "Plastic data handbook" P. 776–778. (KK Kogyo Chosakai, issued on Apr. 5, 1984, pp. 776–778).

Among the above-described surfactant, the nonionic antistatic agent is particularly preferred due to small harmful influences on photographic characteristics and human body, and due to preventing static marks, antistatic property and anti-fogging property. Further, the nonionic antistatic agent is due to increase dispersitivity of the light-shielding materials and fillers.

As the nonionic surfactants, there are for example, polyoxyethylenetridecyl ether, polyoxyethylene oleil ether, polyethyleneglycol, polyoxyethylene nonylphenyl ether, polyoxyethylene octylphenyl ether, polyoxyethylene polyoxypropylene block polymer, sorbitan monolaurate, sorbitan monoorate, polyoxyethylene dodecylamine, polygliceline oleic acid ester, and the like.

Among them, the nonionic surfactants which are liquid at 1 atm and 30 are especially used, for example polyoxyethylenetridecyl ether, polyoxyethylene nonylphenyl ether, polyoxyethylene polyoxypropylene block polymer, polyoxyethylenedodecylamine, polyethyleneglycol, polypropyleneglycol. Because such surfactants prevent transforming the lubricant into white powder, have excellent antistatic property and a small harmful influence on the photosensitive material so as to hardly decrease the photosensitivity thereof. The content of the nonionic surfactants is 0.01–5 wt. %, preferably 0.05–4 wt. %, particularly 0.1–3 wt. %, especially 0.1–2 wt. %. Under 0.01 wt. % of the content, there is no effect of adding the nonionic surfactants, and over 5%, it increases the cost and causes the bad appearance and sense of touch, and fuming.

The compatibilizers are explained below. The compatibilizers cause to compatibilize plural thermoplastic resins having different properties. The thermoplastic resins may be however same sort. For example, recycled thermoplastic resins and new thermoplastic resins can be mixed, or master batch thermoplastic resins in which the light-shielding resins are blended in high density, and diluting thermoplastic resins can also be mixed. Thus, new characters and effects of mixtures of the thermoplastic resins can be found.

There are two types of compatibilizer, nonreactive compatibilizer and reactive compatibilizer. The representative compatibilizers are described.

[Nonreactive Compatibilizer]

styrene-ethylene-butadiene block copolymer resin polyethylene-polystyrene graft copolymer resin polyethyrene-polymethylmethacrylate graft copolymer resin polyethyrene-polymethylmethacrylate block copolymer resin ethylene-propylene-diene copolymer resin ethylene-propylene copolymer resin polystyrene-low density homo-polyethylene graft copolymer resin polystyrene-high density homo-polyethylene graft copolymer resin styrene-butadiene hydrogenolysis copolymer resin styrene-ethylene-butadiene-styrene copolymer resin styrene-butadiene-styrene copolymer resin chlorinated polyethylene resin polypropylene-polyamide graft copolymer resin polypropylene-ethylene-propylene-diene copolymer resin polystyrene-ethyl polyacrylate graft copolymer resin polystrene-polybutadiene graft copolymer resin polystyrene-polymethylmethacrylate block copolymer resin

[Reactive Compatibilizer]
ethylene-propylene maleic anhydride copolymer resin
styrene maleic anhydride graft copolymer resin
styrene-butadiene-styrene maleic anhydride copolymer resin
styrene-ethylene-butadiene-styrene maleic anhydride copolymer resin
ethylene-glycidylmethacrilate copolymer resin
ethylene-glycidylmethacrilate-styrene graft copolymer resin
ethylene-glycidylmethacrilate-methylmetacrylate graft copolymer resin
maleic anhydride graft polypropylene copolymer resin.

The representative compatibilizers in market are described bellow.

Kroton G (trade name, manufactured by Shell: composed of SBS hydrogenolysis, SEBS hydrogenolysis, and maleic acid compounds), Royaltuf (trade name, manufactured by Uniroyal: composed of EPDM-styrene graft copolymer resin, EPDM maleate, and EPDM-acrylonitril copolymer resin), Modiper (trade name, manufactured by Nippon Fat & Oil: composed of block or graft copolymer resin of two sorts of resins), Paraloid (trade name, manufactured by Rohm & Haas: EPDM maleate composed, block copolymer of core shell type), Reseda (trade name, manufactured by To a Gosei: composed of styrene-methylmethacrylate graft copolymer resin), Bondfast (trade name, manufactured by Sumitomo Chemical Co.: composed of ethylene-glynidyl-methacrylate copolymer resin), EXXelor (trade name, manufactured by EXXon Chem: composed of EPDM maleate), Tafftech (trade name, manufactured by Asahi Kasei: composed of SBS, SEBS, and maleic acid compounds thereof), Bennet (trade name, manufactured by High Tech Plastics: composed of EVA-EPDM-polyolefin graft copolymer resin), Dylark (trade name, manufactured by ARCO: composed of styrene-maleic anhydride copolymer resin), Recspal (trade name, manufactured by Nippon Petrpchemicals: composed of ethylene-glycidylmethacrylate copolymer resin), VMX (trade name, manufactured by Mitsubishi Yuka: composed of copolymer of impregnating 50 EVA and 50 styrenes).

(The abbreviations above are:
SBS/styrene-butadiene-styrene copolymer resin
SEBS/styrene-ethylene-butadiene-styrene copolymer resin
EPDM/ethylene-propylene-diene copolymer resin
EVA/ethylene-vinyl acetate copolymer resin).

The content of the compatibilizers in the molded plastic part is preferably 0.5–45 wt. %, particularly 1–40 wt. %, especially 4–30 wt. %.

If the contents is less than 0.5 wt. %, the increase of the physical strength, the improvement of the appearance and the increase of the compatibilization are not effectively achieved. Further, the content is more than 45 wt. %, the rigidity is not enough, there may be a bad influence on the photosensitive material, the cost is so expensive.

Then, blocking inhibitors are explained below. Polyolefin resin, especially copolymer resin including ethylene, often causes blocking because of tackiness thereof. Therefore, the clocking occurs among the molded plastic parts, which make the conveyance thereof difficult, and further, static electricity occurs to generate static marks.

Thus, the blocking will decrease the effect of producing and packaging the molded plastic parts. If the package is made of the molded plastic parts, the blocking occurs among the photosensitive materials and the molded plastic parts, and therefore the photosensitive layer is damaged, the static marks are generated, and the insert of the photosensitive material and the film rewinding become hard.

Accordingly, in the present invention, such troubles should be prevented by containing the light shielding material having the blocking prevention effect, the lubricant having the effect for slipping the photo sensitive material and the blocking inhibition, and the blocking inhibitor.

Especially, the representative blocking inhibitor whose blocking prevention effect is large and which does not have a bad influence on the photosensitive materials to damage the photosensitivity are enumerated: hydrotarcite compounds, amorphous zeolite, powdered silica gel, natural or synthetic silicon dioxide, clay, calcium carbonate, natural or systhetic zeolite, amorphous aluminosilicate, amorphous aluminosilicate anhydride, white titan (titanium dioxide), dintom earth, mixture of amorphous aluminosilicate and minuit and infinite form silica gel, metal substituted crystalline aluminosilicate, metal substituted A-type zeolite, asbestos, silicic acid gel, aluminum silicate, hydroxodahl-lite, kaolinite, talc, magnesium oxide, magnesium oxysulfate fiber (basic magnesium sulfate), synthetic aluminum magnesium silicate, lithium fluoride, and the like.

The dispersing agent for the light-shielding material will be explained below. The dispersing agent is used for dispersing the light-shielding agent and for securing the perfect light-shielding ability even if the amount of the light-shielding material is small.

The representative dispersing agents that have no bad influence on the photosensitive materials are low molecular weight styrene polymers whose molecular weight is 5000–50000, polyethylene wax or polypropylene wax and their derivatives whose averaged molecular weight is 500–20000, fatty acid metal salts, ethylene-bis-amides, and the like.

The following are the typical dispersing agent in marked.

(1) styrene copolymer whose averaged molecular weight is low, 5000–50000: Himer SB, Resit S (trade name, manufactured by Sanyo Kasei Industrial Co.), Elastyrene, Picolastic D (trade name, manufactured by Shell Chemical Co.).

(2) polyethylene wax, polyopropylene wax, or their derivatives whose averaged molecular weight is 500–20000 (the derivatives are for example metal salt of the polyethylene wax or the polypropylene wax, oxidized ones thereof, or denaturalizated ones thereof with the unsaturated organic acid or anhydride thereof such as the maleic acid, acrylic acid, maleic anhidride): AC polyethylene (trade name, manufactured by Allied Chemical), High Wax (trade name, manufactured by Mitsui Petroleum Chemistry)

(3) fatty acid metal salts, ethylene-bis-amides: Armoslip EBS (trade name, manufactured by Lion Akzo), Electro Stripper TS-2B, TS-3B, TS-7B (trade name, manufactured by Kao Soap)

The light reflective light-shielding materials will be explained below. In order to improve the printability (appearance), the molded plastic parts have large reflective index, as the large amount of light is dispersed by the white pigment and shielded. Such molded plastic part preferably contains the light reflective light-shielding materials. The light reflective light-shielding materials are for example titanium dioxide ($TiO_2$), calcium carbonate ($CaCO_3$), aluminum powder, aluminum paste, zinc sulfite ($ZnS$), zinc oxide ($ZnO$), barium sulfate ($BaSO_4$), lied oxide ($PdO$), and the like.

The averaged diameter of titanium oxide particle is 0.01–1.0 μm, preferably 0.05–0.8 μm, particularly 0.10–0.6

μm, especially 0.15–0.40 μm. If the averaged diameter is less than 0.01 μm, the particles tend to cohere, and microgrid easily occurs. If the averaged diameter is more than 1.0 μm, the effect of dispersing the visible rays are not increased so much and the surface becomes uneven.

Yellow pigments likely used are for example titanium yellow, chromium yellow, cadmium yellow, oil yellow, chromophthal yellow GR, quinophthalon, benzizine yellow, and the like.

Silver pigments are for example aluminum powder, aluminum paste, and synthetic pearl powder. They don't have almost a bad influence on the photosensitive property of the photosensitive material, and excellent light-shielding ability. The silver pigments preferably contain one or more sorts of the fatty acids, their compounds, and the surfactants of 0.01–2 parts by weight, one or more sorts of silica gel, titanium dioxide and the calcium carbonate of 0.01–40 parts by weight, and one or more sorts of the aluminum powder and the aluminum paste of 0.1–30 parts by weight in the thermoplastic resin of 100 parts by weight.

The ultraviolet absorber will be explained below. The ultraviolet absorber is used for preventing the light deterioration of the thermoplastic resin. The lens-fitted photo film unit is usually left in the sunshine for a long time, and the quality of the photosensitive materials is to be secured for a long time. Accordingly, the ultraviolet absorbers especially used include polyolefine resins, styrene resins such as aromatic vinyl resincontaining homopolystyrene resin or rubbers, and polycarbonate resins. They are polymerized by using the single site catalysis such that molecular distribution of polymers may be 1.1–5, as same as in case of the antioxidants, the radical captures, the antioxidants filler or the aging resistor. The representative ultraviolet absorbers are enumerated below.

(1) Salicylic Acid Compounds:
  Phenylsalicylate,
  p-t-Butylphenylsalicylate,
  p-octylphenylsalicylate, (2) Benzophenon Compounds:
  2,4-Dihydroxybenzophenone, 2-Hydroxy-4-methoxybenzophenone, 2-Hydroxy-4-octoxybenzophenone, 2-Hydroxy-4-dodecyloxybenzophenone, 2,2'-Dihydroxy-4-methoxybenzophenone, 2,2'-Dihydroxy-4,4'-dimethoxybenzophenone, 2-Hydroxy-4-methoxy-5-sulfobenzophenone (3) Benzotriazole Compounds:
2-(2'-Hydroxy-5'-methylphenyl)benzotriazole,
2-(2'-Hydroxy-5'-t-butylphenyl)benzotriazole,
2-(2'-Hydroxy-3',5'-di-t-butylphenyl)benzotriazole,
2-(2'-Hydroxy-3'-t-butyl-5'-methylphenyl)-5-chlorobenzotriazole,
2-(2'-Hydroxy-3',5'-di-t-butylphenyl)-5-chlorobenzotriazole,
2-(2'-Hydroxy-3',5'-di-t-amylphenylbenzotriazole,
2-(2'-Hydroxy-4'-octoxyphenyl)benzotriazole,
2-[2'-Hydroxy-3'-(3",4", 5"6"-tetrahydrophthalimidemethyl)-5'-methylphenyl]-benzotriazole
2,2-Methylene-bis[4-(1,1,3,3-tetramethylbutyl)-6-(2H-benzotriazole-2-il)phenol]

(4) Cyanoacrylate Compounds:
2-Ethylhexyl-2-cyano-3,3'-di-phenylacrylate
Ethyl-2-cyano-3,3'-diphenylate The contents of the ultraviolet absorbers is 0.01–10 parts by weight in accordance with the 100 parts by weight of the thermoplastic resin, such as polyolefin resins, styrene resins (the styrene resins include homo-styrene resins, polyamide resins, aromatic vinyl resins containing rubber), and poly carbonate resins. The content thereof is preferably 0.05–5 parts by weight, particularly 0.1–3 parts by weight. When the content is less than 0.01 parts by weight, bleeding out easily occurs, which has a bad influence on the photosensitivity of the photosensitive materials. Note that two or more sorts of the ultraviolet absorbers may be used at the same time.

The aging resistors are explained below. The aging resistor prevents aging such as damage of appearance in color, luster and decompose, decrease of the physical strength, and these are progressed in conditions (heat, sunlight, rain, ozone, sulfurous acid gas, etc.) where the thermoplastic resins are disposed.

The representative aging resistors are enumerated as follows.

(1) naphthylamines: phenyl-b-naphthylamine
(2) diphenylamines: N—N'-diphenylethylenediamine
(3) p-phenylenediamines: N,N'-diphenyl-p-phenylenediamine
(4) hydroquinone derivatives:
  6-ethoxy-2,2,4-trimethyl-1,2-dihydroquinaline
(5) monophenols: 2,6-di-tert-butyl-4-methylphenol
(6) polyphenols: 2,2'-methylene-bis-(4-ethyl-6-t-butylphenol)
(7) thiobisphenols:
  4,4'-thiobis-(6-t-butyl-3-methyl-phenol)
(8) 2-mercaptobenzimidazol These aging resistors are arbitrarily blended according to the influence on the photographic characteristic, the aging resistance ability, and the required characteristic.

The content of the aging resistors is 0.01–10 parts by weight in accordance with the 100 parts by weight of the thermoplastic resins, such as polyolefin resins, styrene resins (aromatic vinyl resins containing rubber), and poly carbonate resins. The content is preferably 0.05–5 parts by weight, particularly 0.1–3 parts by weight. When the content is less than 0.01 parts by weight, the aging resisting ability is not enough. When the content is more than 10 parts by weight, bleeding out easily occurs.

The deodorants and aromatics are explained as follows. The representative deodorants are carboxylic acids, carboxylic acid compound with zinc compounds, and carboxylic acid compound with zinc compounds and aluminum compounds.

As the carboxylic acids, there are fatty polycarboxylic acids, aromatic polycarboxylic acids, and acid polyesters which are produced from the fatty of aromatic polycarboxylic acids and higher alcohols, and at the end of which the carboxylic group is substituted.

The fatty polycarboxylic acids are di- or tri-carboxylic acids, such as oxalic acid, malonic acid, succinic acid, adipic acid, fumaric acid, methylfumarate, maleic acid, methylmaleic acid, itaconic acid, acetylic acid, malic acid, methylmalic acid, citric acid, isocitric acid, methaconic acid, and citraconic acid, and their salts. Especially preferable are citric acid and fumaric acid, and their salts.

The aromatic polycarboxylic acids are the carboxylic acid, such as phthalic acid, terephthalic acid, isophthalic acid, trimellitic acid, pilomeritic acid, benzenehexatricarboxylic acid, naphthalenedicarboxylic acid, naphthalenetricarboxylic acid, naphthalenetetracarboxylic acid, azobenzenetetracarboxylic acid and their anhydride. Especially preferable are benzenetricarboxylic acid and trimellitic acid.

The acid polyesters include polyesters of polycarboxylic acid (such as phthalic acid) and higher alcohol such as (ethylenegrycol and diethylenegricol), and acid celluloce derivatives which are denaturated by using the poly carboxylic acid. The zinc compounds which is mixed with the carboxylic acids are inorganic zinc salts, such as zinc oxide, zinc chloride, zinc sulfate, zinc phosphate, and zinc carbonate, and organic zinc compounds, such as zinc citrate, zinc fumarate and the like.

The aromatics include natural aromatics, such as lilac flower oil, jasmine, abies oil, cinnamon oil, lavender oil, and lemon oil. Further, as the aromatics, there are synthetic aromatics, for example graniol, eugenol, n-octylalcohol, carbinol, cis-jasmone, lemonterpen, menthone, methyl salicylate, methylphenylcarbinol, triethylcytrate, benzyl benzoate, citral, d-limonene, methylsinamate, octanol, alkyleneglycol, benzyl salicylate, linalool, vanillin, coumaline, methylnaphtylketone, rosephenone, and the like. The synthetic aromatics are used at atomizing the microcapsule or in cyclodextrin, maltcyclodextrin, cyclodextrin, zeolite, starch, talc and the like.

Another additives may be also added in the thermoplastic resin of the invention. Examples for adding such additives are introduced in the following literatures: New Pigment Compedium (Seibundo Shinkosha Publishing Co. Ltd. 1977), CHEMINDEX 1994 (Japan Chemical Surch. 1993), 12394 Chemical Products (Japan Cemical Surch. 1994), Plastic Data Handbook (Kogyo Chosakai Publishing Co. Ltd. 1984), Dictionary of Pactical Words for Plastics, $3^{rd}$ Edition (Plastic Age Co. Ltd). In the examples to be selected, the additives must have the several properties and abilities and no harmful influences on the photosensitive materials, or often react with another additives to produce harmless compounds. Further, composure of resins may be arranged to apt to apply for the molded plastic parts. Representative instances are described below. However, the present invention is not restricted in the instances.

A. First Categories (Categories of Properties and Abilities for Needs)
1. Processing aid
   a. Processing stabilizer
      (antioxidant, thermo stabilizer), (PVC stabilizer)
   b. Flow modifier (plasticizer, lubricant)
   c. Shaping retaining
      (releasant, shrinkage controller)
2. Modifying ingredient
2-1 Stabilizer (Longevity controller)
   a. Antioxidant
   b. Weather stabilizer
   c. Flame retardant
   d. Biostabilizer
   e. Deterioration restorer
2-2 Solid-state property controller
   a. Impact modifier (elastmers, rubbers, L-LDPE resins)
   b. Reinforcing agent
   c. Colorant
   d. Plasticizer
   e. Foaming agent
   f. Closslinking agent
   g. Nucleus making agent
2-3 Function modifier (Function imparting material)
   a. Conductive materials, Magnetic materials
   b. Antistatic agent
   c. Fluorescent brightner
2-4 Degradation progressing agent
   a. Biodegradation
   b. Degradation by light
   c. Degradation by heat B. Second Categories (Categories for Effects of Additives)
1. Powder modifier
   a. Reinforcing agent/filler
   b. Nucleus making agent
   c. Processing aid
   d. Powder/Powder specific structure
2. Reaction modifier
   a. Closslinking agent
   b. Macromonomer
   c. Thermo-, Photo-, Radius-, Biostabilizer
   d. Degradation processing agent
3. Interface modifier
   a. Coupling agent
   b. Compatibilizer
   c. Plasticizer or Solvent
4. Polymer modifier
   a. Processability modifier, performance modifier
   b. Polymer alloy, blend (performance modification)

In order to prevent burning, silver streak, forming, sink mark and short shot, which suddenly occurs at molding, the molded plastic part preferably contains water of less than 0.5 wt. %, particularly 0.4 wt. %, especially 0.3 wt. % (The value is measured with ISO 2053-76). The resins used for the molded plastic parts are therefore heated or disposed in vacuum space.

When the pellet is made of composure of the molded plastic part which contains a substance, such as the black carbon, easily to absorb water, the pellet is dried in the temperature 50–150, preferably 55–130, particularly 65–110, especially 65–100 and for 0.5–24 hours, preferably 1–20 hours, particularly 2–15 hours, and especially 3–10 hours. The hopper dryer is usually used to dry up as the pellets are continuously dried up. Thus, the workability is improved and the cost decreases.

A process of production of the molded plastic parts is described now. When the molded plastic parts used for the photosensitive material is produced, every sort of the additives explained above is added in the thermoplastic resin compound, and then, the thermoplastic resin compound is supplied for a melt extrusion machine. After being melted, the thermoplastic resin compound is extruded to form in a strand shape, which is cut into the pellets. The pellet is provided into the production line as a material, and the resin is molded into new molded plastic parts.

When molding is carried out, the pellet is heated and melted. As the additives partly evaporate, the larger mount of the additives have been added. Thus, the new molded plastic part contains the predetermined amount of the additives, and the quality thereof is secured.

The new molded plastic parts are provided for the production line, and the film cartridge or the lens-fitted photo film unit is made thereof. After used, the molded plastic parts are withdrawn and recycled.

A process for recycling the molded plastic parts for the photosensitive material is explained below in reference with FIGS. 1 and 2. A recycling line consists of a disassembling line, a plastic recyclng line, and a producing line.

In the disassembling line, metal parts and electrical parts are disassembled for reuse, and thereafter plastic and other parts are provided for the plastic recycling line. When the lens-fitted photo film is recycled, the plastic recycling line is provided with a rear cover, a front cover and a camera body that contain the light-shielding materials such as the carbon black.

Figure 2:
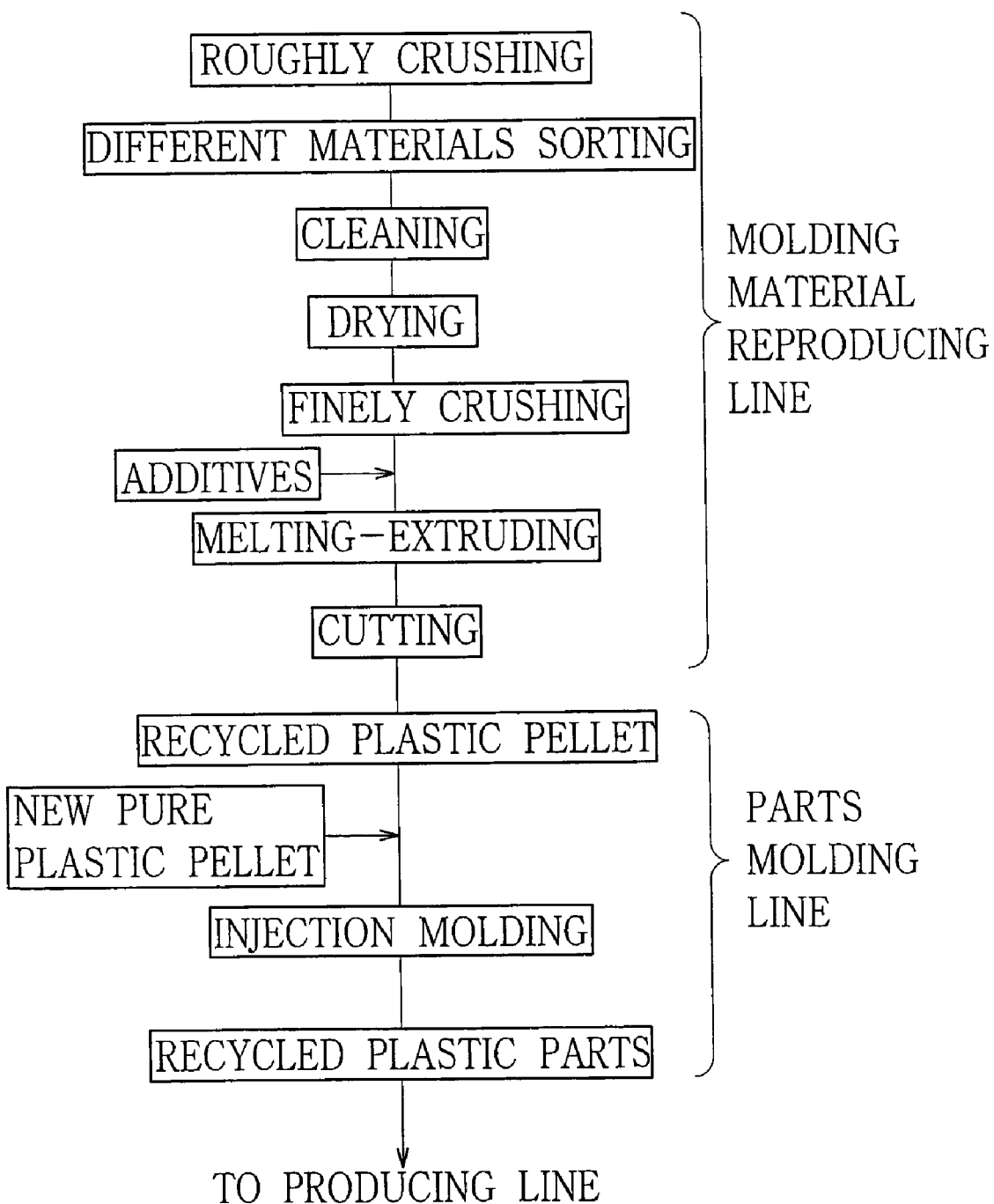
FIG. 2 is a flowchart illustrating a process of producing a recycled first part formed of plastics.

As shown in FIG. 2, a first plastic recycling line includes a molding material reproducing line and a parts molding line. In the molding material reproducing line, the plural plastic parts are crushed and pelletized to a recycled plastic pellet.

A process in the molding material reproducing line includes steps of roughly crushing, different materials sorting, cleaning, drying, finely crushing, melting-extruding, and cutting. In the step of roughly crushing, the plastic parts are crushed to relatively large particles by crushes. The large particles are sent to the different material sorting, and a plastic material is sorted from other materials such as metal fragments. Thereafter, the plastic material is cleaned in the step of cleaning and dried in the step of drying. Then, the plastic material is finely crushed into crushed material in the step of finely crushing, and thereafter, materials such as sand, iron powder, dust, oil, adhesive agent, water-ink, and the like, which are harmful to the photo film, are removed by cleaning in the step of finely crushing.

The crushed material is melted by melt-extruding machine. The melted thermoplastic resin compounds are pressed to have a strand-shape, and cooled down in cold water. Thus, the thermoplastic resin is solidified in the strand-shape, and then, cut in the recycled plastic pellet with a predetermined size.

When the crushed material is heated and melted in the melting-extruding or injection molding, the thermoplastic resin is partly decomposed and deteriorated or modified. Therefore, characters and qualities of the thermoplastic resins becomes worse. Further, the additives such as the carbon black are sometimes modified and the light-shielding ability becomes lower.

The antioxidants have effect of preventing the deterioration of the thermoplastic resin, but the amount thereof in the recycled plastic pellet is smaller than in a new pure plastic pellet. Accordingly, when the recycled plastic pellet is formed, the additives such as the carbon black and the antioxidants are added.

The carbon black causes to secure the light-shielding ability. The carbon black absorbs and captures decomposed products which are produced after forming the thermoplastic resin. A particle of the carbon black would like to have a small diameter. The averaged diameter thereof is preferable 10–80 nm, especially 16–24 nm. The smaller the diameter is, the larger the total size of surfaces of the particles is. Accordingly, absorbing and capturing are more effectively carried out. The carbon black of the present invention, however, is not restricted in the embodiment above. Namely, the carbon black may have other averaged diameters of particles.

As already described, there are several sorts of the carbon black. When some sorts carbon black to be added in the crushed material are selected and mixed, it is inevitable that their density and physical character are suitable, and the averaged diameter of the particle thereof is adequate. The amount of the carbon black to be added may changes in accordance with characters required to the resin compounds, but is preferably 0.2–1.2 wt. % to total weight of the resin compound.

The antioxidants have effects to prevent the deterioration of thermoplastic resin and additives by heat, keep qualities, and inhibit modification and decomposition to the decomposed products. When the antioxidants are used with the carbon black, the effects are not only improved, but also dispersibility of the carbon black and the light-shielding ability.

As already described, there are several sorts of the antioxidants. When the antioxidants is added in the crushed material, some suitable sorts of the antioxidants are selected and mixed. The amount of the antioxidants to be added may changes in accordance with characters required to the resin compounds, but is preferably 0.02–0.3 wt. % to total weight of the resin compound.

According to date of production and kind of product, different sorts of the carbon black or the antioxidants may be added. Several kinds of the plastic parts, whose dates of manufacture are usually several, are crushed at the same time for recycling to the crushed material to form the molded plastic parts. Therefore, several sorts of the carbon blacks and the antioxidants are contained in the crushed material. Not only the same carbon blacks or the antioxidants but also others are added therein, as far as they may have specific influences on the crushed material.

The recycled plastic pellet which is reproduced in such steps is provided for the parts molding line. In the parts molding line, the recycled plastic pellet and the new pure plastic pellet are mixed, or only the recycled plastic pellet is used as a molding material for producing recycled plastic molded parts. The recycled plastic molded parts are provided for the producing line and constructed to products. Namely, the recycled plastic molded part contains the carbon black or the antioxidants, and therefore, has the same property and quality, for example the light-shielding properties, as the new one. Further, in the recycled plastic molded parts, the decomposition is prevented, which cause to keep the photographic characteristics. As the results of the examination shows, the decrease of the impact strength is prevented in the recycled plastic molded part by adding the new pure plastic pellet containing rubber-like material.

In the above embodiments, the carbon blacks and the antioxidants are added when the recycled plastic pellet is reproduced. They may be also added in a molding process, or separately added in reproducing and molding processes.

Figure 3:
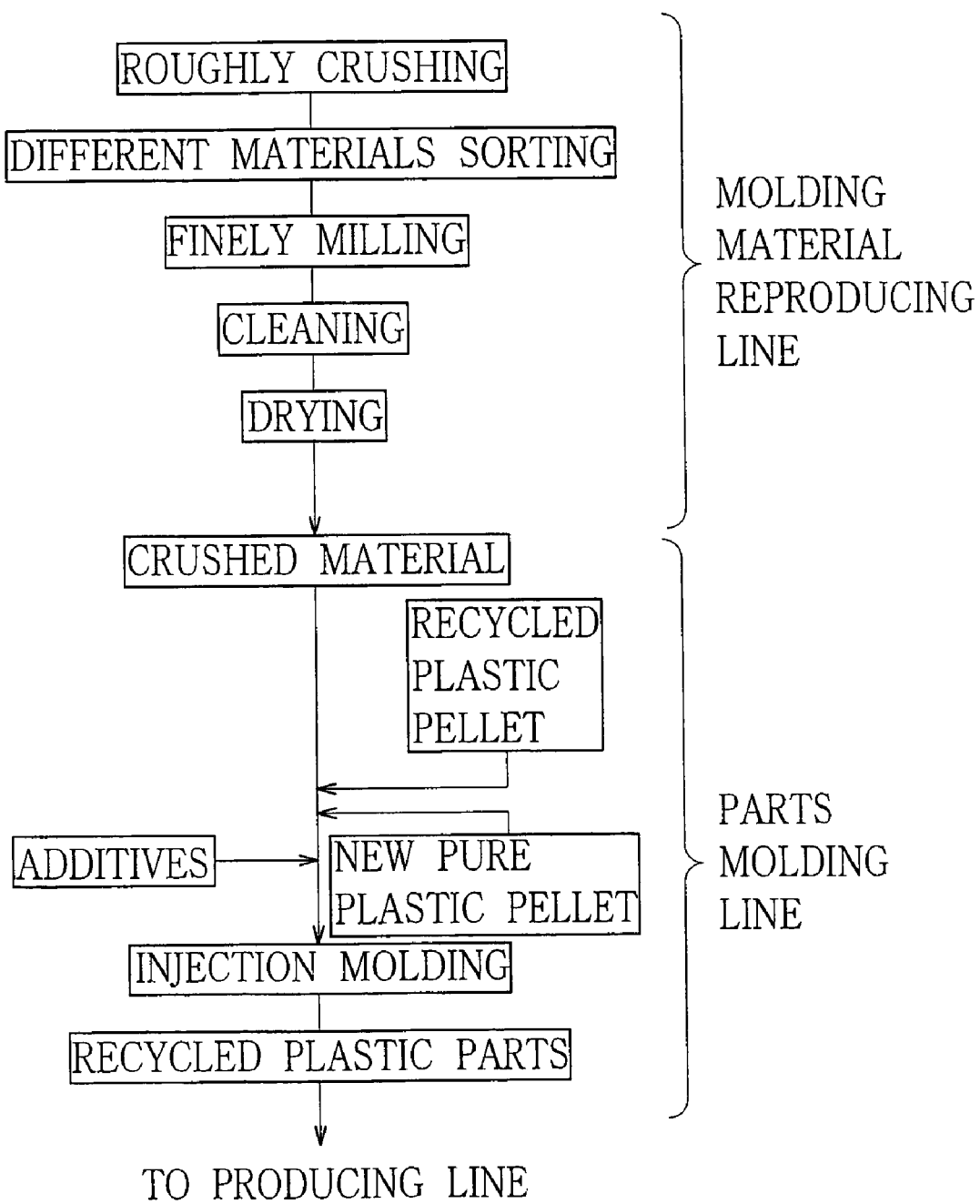
FIG. 3 is a flowchart illustrating a process of producing a recycled second part formed of plastics.

In the first plastic recycling line illustrated in FIG. 2, the crushed material is pelletized to the recycled plastic pellet by an extruding machine, and the recycled plastic pellet is used as a part or a whole of the molding material, which is provided for the formation line. A second plastic reproducing line illustrated in FIG. 3, the crushed material is crushed, cleaned and dried and then, supplied for the molding line as a part of the molding material without being pelletized. The crushed material is mixed with other materials (recycled plastic pellet is new pure plastic pellet). When the crushed material is used as the molding material, the carbon blacks and the antioxidants are added at molding, and further, the crushed material is not pelletized, which decreases the cost for production.

As described above, the recycled plastic molded part contains the carbon black and the antioxidants. Therefore, it is used as an unit for packaging the photosensitive materials, such as a resin-made film cartridge, a photo disc film cartridge (representatively for APS), an instant film unit, the lens-fitted photo film unit, a case body for photo film cartridge, a cap for photo film cartridge, a case for photo film, a spool for photo-film, a dark box, a cartridge for photo film, a light-shielding magazine for loading rolled or sheet type of photosensitive materials in a lighted room, a core, photo film cartridge, an instant film pack, a magazine for sheet film, a sheet film pack, a holder for sheet film pack, a camera for photography, and a photosensitive material processor. They must keep the light-shielding ability and the photographic characteristics of the photo film.

Figure 4:
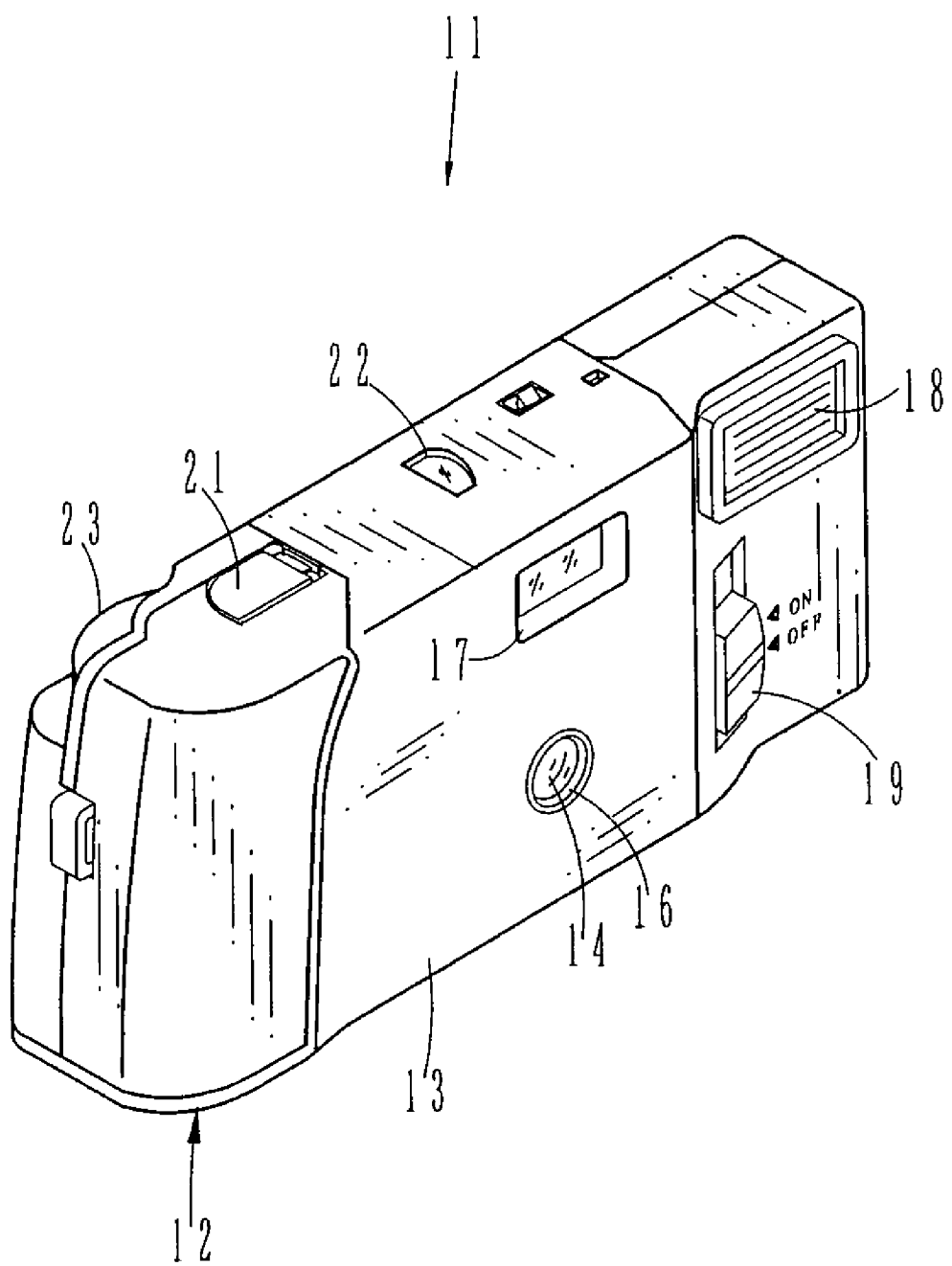
FIG. 4 is a perspective view of a lens-fitted photo film unit.

The lens-fitted photo film unit is an example among them. As shown in FIG. 4, the lens-fitted photo film unit 11 is constituted of a camera body 12, and a label 13 partly covering the camera body 12. In the camera body 12, the photo film is loaded. A front face of the lens-fitted photo film unit 11 is provided with an aperture from which a taking lens 14 is exposed, an opening 17 where a finder lens is exposed, and an opening 16 from which a flash light projector 18 is exposed. Below the flash light projector 18, a charge operation member 19 for the flash light projector 18 is disposed. The lens-fitted photo film unit 11 has further a shutter button 21 and a film counter window 22 on an upper face thereof. Further, a film roll knob 23 is formed on the upper face and a rear face.

Figure 5:
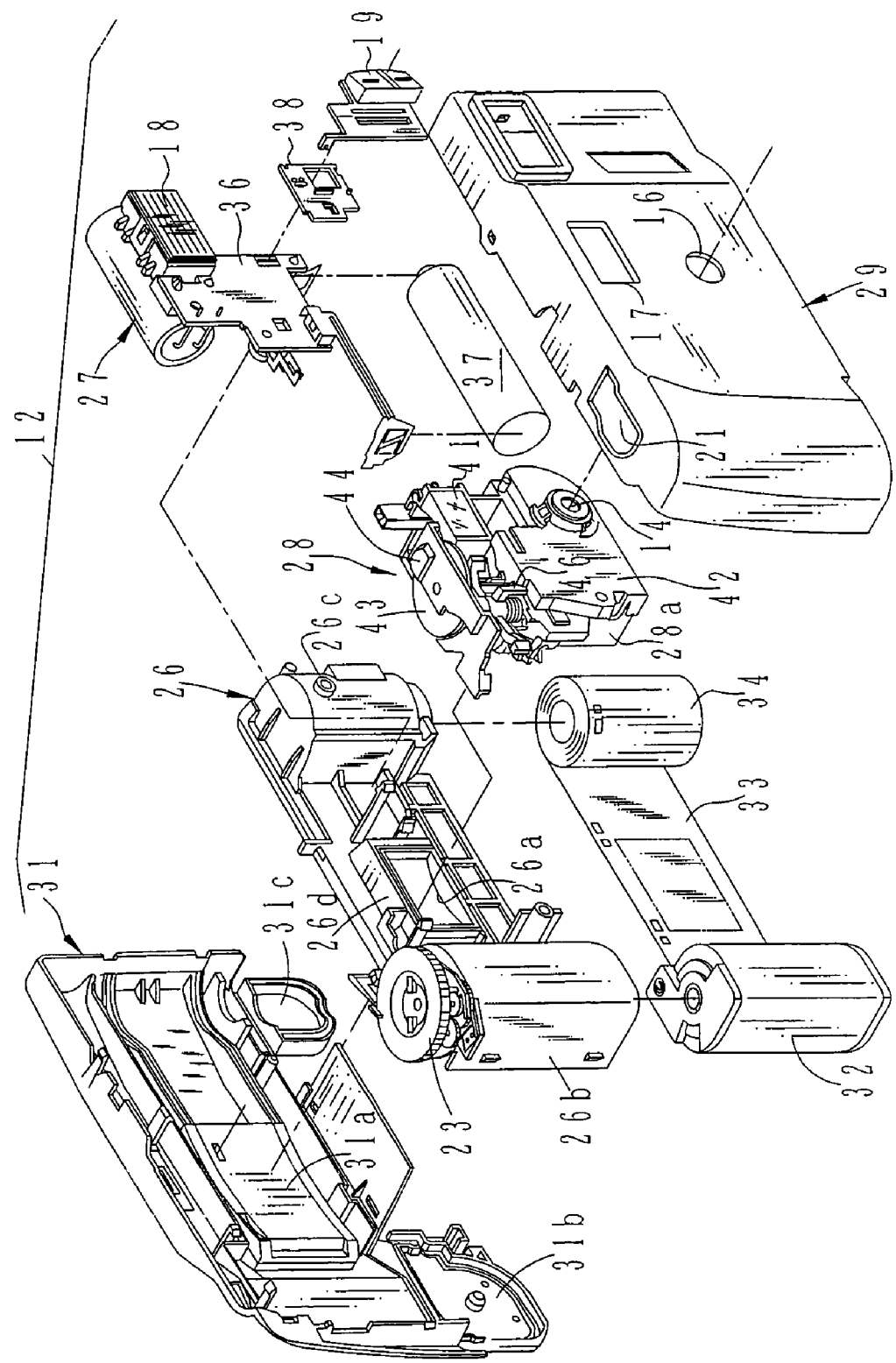
FIG. 5 is an exploded perspective view of the lens-fitted photo film unit.

As shown in FIG. 5, the camera body 12 is constituted of a base portion 26, a flash unit 27, an exposure unit 28, a front rear cover 29, and a rear cover 31. The base portion 26, the front cover 29 and the rear cover 31 are made of plastics, and they are molded after reproducing the molding material in the recycling line because of keeping hygiene and quality thereof.

The base portion 26 has an exposure frame 26a in the middle thereof. In both sides of the exposure frame 26a, a cartridge room 26b for loading a cartridge 32 and a film roll chamber 26c for loading a film roll 34, which is a roll of the photo film 33 extracted from the cartridge 32, are formed in an integral manner. The exposure frame 26a determines an exposure region of a frame on a photo film 33 that is sent to the photographic position. From the exposure frame 26a, an exposure chamber base 26d is protruded forwards with a shape of a rectangular tube. In combination of a dark box 28a of the exposure unit 28 to the base portion 26, an exposure chamber is formed.

In upper and lower sides on a rear face of the exposure frame 26d, a film rail (not shown) is formed. On a front side of the rear cover 31, a film regulation surface 31a is formed. The film regulation surface 31a constitutes a film feeding space in combination of the film rail, when the rear cover 31 is attached to the base portion 26. The photo film 33 is rolled at photography. The photo film 33 is fed with contacting to the film rail and the film regulation surface 31a and both sides of the photo film is supported by them.

The cartridge chamber 26b and the film roll chamber 26c, has openings on bottom faces thereof. The openings are covered with bottom lids 31b, 31c of pull top type. The bottom lids 31c, 31d are attached to the rear cover 31, and can be freely opened and closed. The bottom lid 31b is opened when the cartridge 32 of the exposed photo film is removed. The flash unit 27 has a print board 36, circuit elements including a flash charge circuits, the flash light projector 18, a synchronized switch, a pair of battery contacts segments, and a condenser. The flash unit 27 is disposed between the exposure unit 28 and a film roll chamber 26, and removably attached to the base portion 26. The flash circuit is charged from batteries 37.

The charge operation member 19 is operated to start or stop the flash circuit charging, and connected through a receiving board 38 to a front face of the print board 36. When the charge operation member 19 is slid, the flash light circuit is driven as a switch segment connects to a contact point of the print board 36. The charge operation member 19 is made of plastic, to which uses touches. Because of hygiene, the charge operation member 19 is recycled.

The exposure unit 28 is an unit portion where a finder lens 41, a film counter mechanism, a shutter mechanism and a film roll mechanism are disposed on the dark box 28a, and a shutter blade (not shown) and a shutter cover 42 are attached on a front face of the dark box 28. The taking lens 14 is removably attached to the shutter cover 42 so as to be examined and cleaned after removal. When the exposure unit 28 and the taking lens 14 don't pass the examination, they are sent to the plastic recycling line for recycling.

In upper side of the dark box 28a, plural shafts and shaft holes are formed. To the shafts and the shaft holes, a film counter board 43, an upper board 44, a shutter drive lever 46, an engage lever, a cam member, a spring and the like are attached. These are made of plastic except for the spring.

A process of recycling the lens-fitted photo film unit is explained below. From the lens-fitted photo film unit 11 already used, the photo film 33 and the film cartridge 32 are removed in a photofinishing laboratory, and the camera body 12 is withdrawn to a production. Then, the camera body 12 is sorted in accordance with a kind thereof and sent to the disassembling line.

In the disassembling line, after the label 13 is peeled off, the front cover 29, the charge operation member 19, and the film roll knob 23 are disassembled, and sent to the plastic recycling line. Then, the exposure unit 28, the battery 37, and the flash unit 27 are disassembled. The exposure unit 28 and the flash light unit 27 are reused after examination and cleaning. The battery 37 is withdrawn by a production thereof. The base portion 26 and the rear cover 31 are separately conveyed in the plastic recycling line. In the plastic recycling line, the carbon blacks and the antioxidants are added for recycling the plastic parts.

First and second examinations of the photographic characteristic will be explained. In the examinations, the photographic characteristics of the recycled resin is compared with that of the new resin. The first examination is carried out in following process. A sample pellet and the photo film is contained in a case for a week. Then, the photo film is fished out, and after development of the photo film, fogging and change of the photosensitivity are estimated. In the case, the temperature and the humidity are kept at 50 and 60%. The amount of the sample pellet in the case is 500 g, and the photo film is color negative film for 36 exposures of 135 type and ISO sensitive 800.

The extruding machine used for generating the sample pellet is a known one-axial extruding machine of bento-type. According to the extruding machine, a diameter D of a screw is 100 nm, L/D is 28, in which L is the effective length of the screw, and the temperature for extruding the sample pellet is 230.

In the first examination, 5 sample pellets 1–5 are used. The sample pellet 1 is used as a model of the new resin which is made of a mixture of the polystyrene resin and the butadiene rubber. In order to prepare the sample pellet 1, the carbon master batch resin is generated while the content of the carbon black in the thermoplastic resin is 24.5 wt. %. The carbon master batch resin is mixed in the new resin in ration of 1 to 35. Thus, the new resin is mixed with the carbon black, and pelletized by the extruding machine once. According to the carbon black, the averaged diameter of the particles is 24 nm, PH is 8.0, nitrogen adsorption specific surface area is 110 m$^2$/g. Such carbon black is called C1, and the carbon master batch including C1 is called CM1 bellow.

The CM1 is produced in the following known process. The carbon black, the zinc stearate and the polystyrene resin are mixed in ratio by weight of 1:49:50, and crushed by Banbury mixer to produce a resin containing high density carbon. Then, the resin containing high density carbon and the new resin are mixed in ratio by weigh of 1:1 and extruded by the extruding machine to produce the CM1.

The sample pellets 2–5 are models of the recycled resin and compared with the sample pellet 1. The sample pellet 2 is made of the same additives in the same ratio of the pellet 1. However, the pellet 2 is 5 times melted and extruded by the extruding machine. When the recycled resin is produced, the used molded plastic parts are melted in heat to reproduce the molding material. When the new resin is melted 5 times, it becomes as if it were the recycled resin.

In order to obtain the sample pellet 3, a mixture of the same additives in the same ratio of the pellet 1 is prepared. However, the mixture is 4 times melted and extruded by the extruding machine. Then, the mixture is provided with the CM1 in amount of 1/30 to the first addition thereof (compared to the amount of addition when the pellet 1 is made), and further extruded by the extruding machine once. Therefore, as in the pellet 2, the new resin is 5 times melted in the pellet 3.

In order to obtain the sample pellet 4, a mixture containing the same additives in the same ratio of the pellet 1 is 4 times melted and extruded by the extruding machine. However, the mixture is provided with a CM2 containing a carbon black C2, and further extruded by the extruding machine once. The C2 is different from the C1. According to the C2, the averaged diameter of the particles is 16 nm, PH is 7.5, nitrogen adsorption specific surface area is 260 m2/g. In the CM2, 24.5 wt. % of the C2 is contained. The carbon master batch resin mixed in the new resin in ration of 1 to 35. The amount of the CM2 is 1/30 to the addition of the CM1 (compared to the amount of addition when the pellet 1 is made). The CM2 is produced in the same process by the CM1.

In order to produce the sample pellet 5, a mixture of the same additives in the same ratio of the pellet 1 is 4 times melted and extruded by the extruding machine. Then, the mixture is provided with the CM2 and the antioxidant, and further extruded by the extruding machine once. The CM2 is added in the same ratio as by the pellet 4, and the content of the antioxidant in the pellet 5 is 0.05 wt. %. As the antioxidant, IRAGANOX 1076 (Chiba gaigy) is used.

In FIG. 6 (Table 1), a result of the first examination of the photographic characteristic is shown. In order to estimate the photographic characteristics of the sample pellets 2–5, the sample pellet 1 is a criterion.

According to an estimation of the sample pellet 2, the photographic characteristic becomes worse after the resin is melted several times. According to the sample pellets 3 and 4, the photographic characteristics are improved when the carbon black is added to the resin. Further, the C2 causes the photographic characteristic to improve more than the C1, which shows that the kind of the added carbon black determines how much the photographic characteristic is improved. The estimation of the sample pellet 5 teaches that the photographic characteristics is more improved when the carbon black and the antioxidants are added.

The second examination of the photographic characteristic is explained below. In the second examination, a unit body for the lens-fitted photo film unit is made of the sample pellet. The photo film is loaded in the unit body. Thus, the second examination is carried out in a circumstance in which the photo film is usually used, and the fogging and the change of the photosensitivity are estimated.

For the second examination, five sample molded parts groups 1–5 are prepared. Every sample molded parts group consists of parts constructing the unit body, such as a front cover, a body portion and a rear cover, which are molded by using one of pellets a'–e'. Accordingly, the one unit body is made of one of the pellets a'–e'. In every lens-fitted photo film unit, the photo film is loaded. Then, the lens-fitted photo film unit is packed with a paper for explanation in a package made of laminated aluminum foil and polyethylene film, and left under the condition at the temperature of 45 and the humidity of 60% for 30 days. Thereafter, the photo film is removed from the lens-fitted photo film unit, and developed in the same way of the first examination. After development, fogging and change of the photosensitivity are estimated. Note that packaging is carried out in a known pillow type packaging with a packaging machine, and an opening of the package is closed with an adhesive tape. Therefore, the outer air cannot intrude into the package after packing.

The sample molded parts groups 1–5 will be explained now. The sample molded parts group 1 is a model made of a new resin. The sample molded parts groups 2–5 are models made of recycled resin.

The sample molded parts group 1 includes articles molded with injection by using the pellet a' as the molding material. In order to obtain the pellet a', a mixture of the same additives and the same thermoplastic resin in the ratio of the sample pellet 1, and melted by the melting machine once.

The sample molded parts group 2 includes articles molded with injection by using the pellet b' as the molding material. In order to obtain the pellet b', a mixture of the same additives and the same thermoplastic resin in the ratio of the sample pellet a' is prepared. However, the mixture is 4 times melted and extruded by the extruding machine.

The sample molded parts group 3 includes articles molded with injection by using the pellet c' as the molding material. In order to produce the sample pellet c', a mixture of the same additives in the ratio of the pellet b' is 3 times melted and extruded by the extruding machine. However, the mixture is provided with the CM2 that is used also in the first examination, and further extruded by the extruding machine once. The reason for using the CM2 in the second examination is that the CM2 causes the photographic characteristic to improve more effectively than the CM1, when the result of the first examination is considered. Note that the amount of the CM2 is 1/30 to the addition of the CM1 (compared to the amount of addition when the camera body 1 is made).

The sample molded parts group 4 includes articles molded with injection by using the pellet d' as the molding material. In order to obtain the sample pellet d', a mixture of the same additives in the ratio of the pellet b' is melted in heat and extruded 3 times by the extruding machine. However, the mixture is provided with the CM3 that is different from the CM2, and further extruded by the extruding machine once.

The CM3 is a master batch resin that is generated from the CM2 containing the 1.5 wt. % of antioxidants. The C2, the new resin, and the antioxidants are mixed in ratio by weight of 49:48.5:1.5, and processed in the same way of producing the CM1. Thus, the CM3 is obtained. The amount of the added CM3 is 1/30 to the addition of the CM1 (compared to the amount of addition when the camera body 1 is made). Accordingly, the content of the antioxidant in the CM3 is 0.05 wt. %.

The sample molded parts group 5 includes articles molded with injection by using the pellet e' as the molding material. In order to produce the sample pellet e', a mixture of the same additives in the ratio of the pellet b' is 3 times melted and extruded by the extruding machine. Thereafter, the mixture is provided with the new resin, whose content may be 10 wt. %, and melted and extracted by the extracting machine.

In Table 2 of FIG. 6, a result of the second examination of the photographic characteristic is shown. In order to estimate the photographic characteristics of the sample molded parts groups 2–5, the sample molded parts group 1 is a criterion.

Considering Table 2, the photographic characteristic hardly becomes worse when the carbon black is added to the resin. The reason for adding the new resin in the pellet e' is to prevent the impact strength of the sample molded parts group 5 from becoming lower. Namely, the carbon black causes the photographic characteristic to be kept, although it causes the impact strength of the molded plastic parts to become lower.

According to the sample molded parts groups 2–5, an examination of the impact strength is carried out. Table 3 of FIG. 7 teaches that the Izod impact strength becomes lower when the carbon black is added, and the Izod impact strength is improved when the new resin is added.

Further, a total examination is carried out, in which the photographic characteristic and the physical properties are totally examined, such as the tensile strength, the impact strength, the heat resistance and the like. In the total examination, five sample lens-fitted photo film units 1–5 (hereafter called sample film units 1–5) are used.

A sample film unit 1 is constituted of parts molded with injection by using the 100% new resin. Every recycled sample film unit is constituted of recycled plastic molded parts. And a process of the total examination is as same as in the second examination. Namely, the sample film unit is packed with a paper for explanatory in a package made of laminated aluminum foil and polyethylene film, and left under the condition at the temperature of 45 and the humidity of 60% for 30 days. Thereafter, the photo film is removed from the sample film unit, developed in the same way of the first examination, and fogging and change of photosensitivity are estimated.

According to the sample film unit 1, the thermoplastic resin containing the butadiene rubber, the carbon black, the antioxidant and other additives are added in the polystyrene resin.

The sample film units 2–5 are made of the recycled plastic pellet, which are made of the molding material reproduced from the used lens-fitted photo film units. The parts of the uses lens-fitted photo film unit withdrawn from the markets are disassembled in the recycling line. The parts made of plastic are crushed and melted in heat to generate the recycle pellet. In the recycled plastic pellet for the sample film unit 2, neither the new resin nor the other additives are added.

In the pellet for the sample film unit 3, the CM2 is added. The amount of the added CM2 is 1/30 to the addition of the CM1 (compared to the amount of addition when the sample film unit 1 is produced).

In the pellet for the sample film unit 4, the CM3 containing the C2 and the antioxidants is added. The amount of the added CM3 is as same as that of the CM2 added in the pellet for the sample film unit 3.

In the pellet for the sample film unit 5, the CM3 and the new resin are added such that the content of the new resin may be 10 wt. %.

Table 4 of FIG. 7 illustrates estimations of physical properties. The physical properties of recycled film units 2–5 are compared with that of a sample film unit 1.

The results of the examinations teach that the carbon blacks absorb/capture the discomposed products to reduce the harmful influences on the photographic characteristics. When the antioxidants are added with the carbon black, the antioxidants prevent generation of decomposed products. Further, when the new resin is also added, the impact strength hardly becomes lower.

In the above embodiments, the antioxidants are used. However, other oxidation inhibiting materials may be added without or with the antioxidants.

Other Materials for absorbing the decomposed products may be used than the carbon black, if they have no harmful influence on the photographic characteristics and don't cause the light-shielding ability and the impact strength to become lower. There are aluminum oxide, titanium oxide and the like.

The new resin is used as the additives make the property of the resin lower. The new resin is not only the same as, but also different from the resin used in the withdrawn articles, as far as they are compatible with each other.

The ratio of the additives and the new resin to be added is not restricted in the above description, adjusted adequately. The carbon black had better have the high absorbability. Therefore, it is preferable that the carbon black is porous and the averaged diameter thereof is small.

The additives can be added when the crushed material is palletized, or when the recycled plastic pellet, the crushed material and the new material are mixed. Further, as the molding method, there are injection molding, vacuum forming, blow molding, extrusion molding, and the like.

According to method of adding the additives, the master batch resin containing the additives in high density is produced and added, or the additives are crushed into powder of fine particles and added. Preferably, the master batch resin is added, considering the easiness of work and the rareness of polluting the fabric. If the master batch resin is added at producing the new articles in the fabric, the master batch resin is preferably used.

The additives are not only the carbon black and the antioxidants, but also the silicon oil for decreasing the frictional force, the fatty acid metal salt for improvement of the moldability, surface active agent for improvement of the antistatic effect.

The present invention is not applied only to the lens-fitted photo film unit, but also to the film cartridge, instant film unit, the spool and the cartridge for the rolled photo film, a film sheet package, a film sheet holder, a film sheet unit, the light-shielding magazine for loading rolled or sheet type of photosensitive materials in a lighted room, and the core.

The invention claimed is:

1. Recycled plastic molded parts for photosensitive materials, said recycled plastic molded parts being made of a molding material, said molding material comprising:
    a crushed material made by crushing used molded plastic parts, said used molded plastic parts being made of thermoplastic resin;
    carbon black, wherein a nitrogen adsorption specific surface area of said carbon black is equal to 260 $m^2/g$; and
    oxidation inhibiting material.

2. The recycled plastic molded parts as defined in claim 1, wherein said crushed material is added as a recycled plastic pellet, said crushed material being melted, extruded and cut to form said recycled plastic pellet.

3. The recycled plastic molded parts as defined in claim 2, wherein said carbon black and said oxidation inhibiting material are added as a master batch plastic pellet, said carbon black and said oxidation inhibiting material being mixed with a thermoplastic resin, melted, extruded and cut to form said master batch plastic pellet.

4. Recycled plastic molded parts for photosensitive materials, said recycled plastic molded parts being made of a molding material, said molding material comprising:
    a crushed material made by crushing used molded plastic parts, said used molded plastic parts being made of thermoplastic resin;
    new plastic material containing rubber;
    carbon black, wherein a nitrogen adsorption specific surface area of said carbon black is equal to 260 $m^2/g$; and
    oxidation inhibiting material.

5. The recycled plastic molded parts as defined in claim 4, wherein said crushed material is added as a recycled plastic pellet, said crushed material being melted, extruded and cut to form said recycled plastic pellet.

6. The recycled plastic molded parts as defined in claim 5, wherein said carbon black and said oxidation inhibiting material are added as a master batch plastic pellet, said carbon black and said oxidation inhibiting material being mixed with a thermoplastic resin, melted, extruded and cut to form said master batch plastic pellet.

7. The recycled plastic molded parts as defined in claim 6, wherein an averaged diameter of particles of said carbon black is 16–24 nm.

* * * * *